US012731886B2

(12) United States Patent
Ng et al.

(10) Patent No.: US 12,731,886 B2
(45) Date of Patent: Sep. 8, 2026

(54) MULTIBAND VEHICLE ROOFTOP ANTENNA ASSEMBLY

(71) Applicant: TE Connectivity Solutions GmbH, Schaffhausen (CH)

(72) Inventors: KokJiunn Ng, Prai (MY); Yihjia Teoh, Prai (MY); Enchi Lee, Prai (MY)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 149 days.

(21) Appl. No.: 18/596,791

(22) Filed: Mar. 6, 2024

(65) Prior Publication Data

US 2024/0304985 A1 Sep. 12, 2024

(51) Int. Cl.

| | |
|---|---|
| ***H01Q 1/28*** | (2006.01) |
| ***H01Q 1/32*** | (2006.01) |
| ***H01Q 21/28*** | (2006.01) |
| *H01Q 1/42* | (2006.01) |
| *H01Q 9/42* | (2006.01) |

(52) U.S. Cl.

CPC .......... *H01Q 1/3275* (2013.01); *H01Q 21/28* (2013.01); *H01Q 1/42* (2013.01); *H01Q 9/42* (2013.01)

(58) Field of Classification Search

CPC ........ H01Q 1/3275; H01Q 21/28; H01Q 1/42; H01Q 9/42

See application file for complete search history.

(56) References Cited

U.S. PATENT DOCUMENTS

2025/0279583 A1* 9/2025 Koparan ................ H01Q 1/526

* cited by examiner

*Primary Examiner* — Graham P Smith

(57) ABSTRACT

A multiband vehicle rooftop antenna assembly includes an antenna base configured to be mounted to a rooftop of a vehicle. The antenna base has an outer perimeter includes a front, a rear opposite the front, a first side, and a second side opposite the first side. The multiband vehicle rooftop antenna assembly includes cellular antennas operable over one or more cellular frequencies mounted to the antenna base at the outer perimeter along the front, the rear, the first side, and the second side. The multiband vehicle rooftop antenna assembly includes Wi-Fi antennas operable over one or more Wi-Fi frequencies mounted to the antenna base at the outer perimeter between the cellular antennas. The multiband vehicle rooftop antenna assembly includes a satellite antenna operable over one or more satellite frequencies and located at a central location between the front and the rear and between the first side and the second side.

24 Claims, 23 Drawing Sheets

MULTIBAND VEHICLE ROOFTOP ANTENNA ASSEMBLY

CROSS REFERENCE TO RELATED APPLICATIONS

This application claims the benefit of Malaysia Application No. PI 2023001199 filed 6 Mar. 2023, the subject matter of which is herein incorporated by reference in its entirety.

BACKGROUND OF THE INVENTION

The subject matter herein relates generally to antenna assemblies.

Several types of antennas are used in the vehicle/automotive, Intelligence transportation system, Machine to Machine system (M2M), Internet of Thing (IoT) etc., including Wi-Fi, Bluetooth Low Energy (BLE), AM/FM radio antennas, satellite digital radio service antenna, global positioning system antennas, cellular antennas, and the like. The antenna assembly is operable for transmitting and/or receiving signals to/from the vehicle, device, or building. Some known antennas are multiband antennas having multiple antennas to cover and operate at multiple frequency ranges and applications. For automotive or vehicle, antennas may be installed or mounted on a vehicle surface, such as the roof, trunk, or hood of the vehicle to help ensure that the antennas have unobstructed views overhead or toward the zenith. These antennas may be mounted on the surface of a device or machine. The antennas are also can be configured to be wall mounted or ceiling mount to buildings with additional hardware kit. The antenna may be connected via a coaxial cable to one or more electronic devices, such as a radio receiver, a touchscreen display, a navigation device, a cellular modem, an autonomous driving system, intelligent transportation system and the like. However, it is desirable that the cover or radome of the antenna assembly be aerodynamic and stylish. Thus, the dimensions of the antenna assembly are small and low profile, leaving little space for the antenna elements within the interior enclosure of the radome. The antenna elements must be sized to fit within the radome, making the antenna to maintain superior performance for very wide frequency bands difficult. Also, close position of the multi antenna elements within the radome lead to high mutual coupling and reductions in Multiple Input Multiple Output (MIMO) antenna system performance.

A need remains for a multi antenna assembly conformable to a low and small antenna profile that is operable in multiple frequency bands.

BRIEF DESCRIPTION OF THE INVENTION

In one embodiment, a multiband vehicle rooftop antenna assembly for installation to a rooftop of a vehicle is provided. The multiband vehicle rooftop antenna assembly includes an antenna base configured to be mounted to the rooftop. The antenna base includes a ground plane. The antenna base has an outer perimeter includes a front, a rear opposite the front, a first side, and a second side opposite the first side. The multiband vehicle rooftop antenna assembly includes cellular antennas configured to be operable over one or more cellular frequencies. The cellular antennas are mounted to the antenna base at the outer perimeter along the front, the rear, the first side, and the second side. The multiband vehicle rooftop antenna assembly includes Wi-Fi antennas configured to be operable over one or more Wi-Fi frequencies e.g., 2.4-2.5 GHZ, 4.9-6 GHz and 6-7.125 GHz. The Wi-Fi antennas are mounted to the antenna base at the outer perimeter between the cellular antennas. The multiband vehicle rooftop antenna assembly includes a satellite antenna configured to be operable over one or more satellite frequencies. The satellite antenna configured to be operable for receiving Global Navigation Satellite System (GNSS) signals. The satellite antenna is central between the front and rear and between the first and second sides.

In another embodiment, a multiband vehicle rooftop antenna assembly for installation to a rooftop of a vehicle is provided. The multiband vehicle rooftop antenna assembly includes an antenna base configured to be mounted to the rooftop of the vehicle. The antenna base includes a ground plane. The antenna base has an outer perimeter includes a front, a rear opposite the front, a first side, and a second side opposite the first side. The multiband vehicle rooftop antenna assembly includes cellular antennas configured to be operable over one or more cellular frequencies. The cellular antennas are mounted to the antenna base at the outer perimeter along the front, the rear, the first side, and the second side. Each cellular antenna includes a monopole includes a feed portion at the bottom of the monopole and an upper portion at the top of the monopole. The upper portion is bent in a non-planar configuration. The multiband vehicle rooftop antenna assembly includes integrated Wi-Fi open slot antennas or BLE antennas integrated with the cellular antennas. The integrated Wi-Fi open slot antenna configured to be operable over one or more Wi-Fi frequencies. Each integrated Wi-Fi antenna is integrated into the upper portion of the monopole of the corresponding cellular antenna. The multiband vehicle rooftop antenna assembly includes a satellite antenna configured to be operable over one or more satellite frequencies. The satellite antenna configured to be operable for receiving Global Navigation Satellite System (GNSS) signals. The satellite antenna is central between the front and rear and between the first and second sides.

At a further embodiment, a multiband vehicle rooftop antenna assembly for installation to a rooftop of a vehicle is provided. The multiband vehicle rooftop antenna assembly includes an antenna base configured to be mounted to the rooftop of the vehicle. The antenna base includes a ground plane. The antenna base has an outer perimeter includes a front, a rear opposite the front, a first side, and a second side opposite the first side. The multiband vehicle rooftop antenna assembly includes cellular antennas configured to be operable over one or more cellular frequencies. The cellular antennas are mounted to the antenna base at the outer perimeter along the front, the rear, the first side, and the second side. Each cellular antenna includes a monopole includes a feed portion at the bottom of the monopole connected to a cellular feed extending through the antenna base. The monopole includes an upper portion at the top of the monopole. The upper portion is bent in a non-planar configuration. The monopole includes a shorting leg extending between the upper portion and the ground plane. The multiband vehicle rooftop antenna assembly includes Wi-Fi antennas configured to be operable over one or more Wi-Fi frequencies. Each Wi-Fi antenna is connected to a Wi-Fi feed extending through the base. The multiband vehicle rooftop antenna assembly includes a satellite antenna configured to be operable over one or more satellite frequencies. The satellite antenna configured to be operable for receiving Global Navigation Satellite System (GNSS) signals. The satellite antenna is central between the front and rear and between the first and second sides.

DETAILED DESCRIPTION OF THE INVENTION

Figure 1:
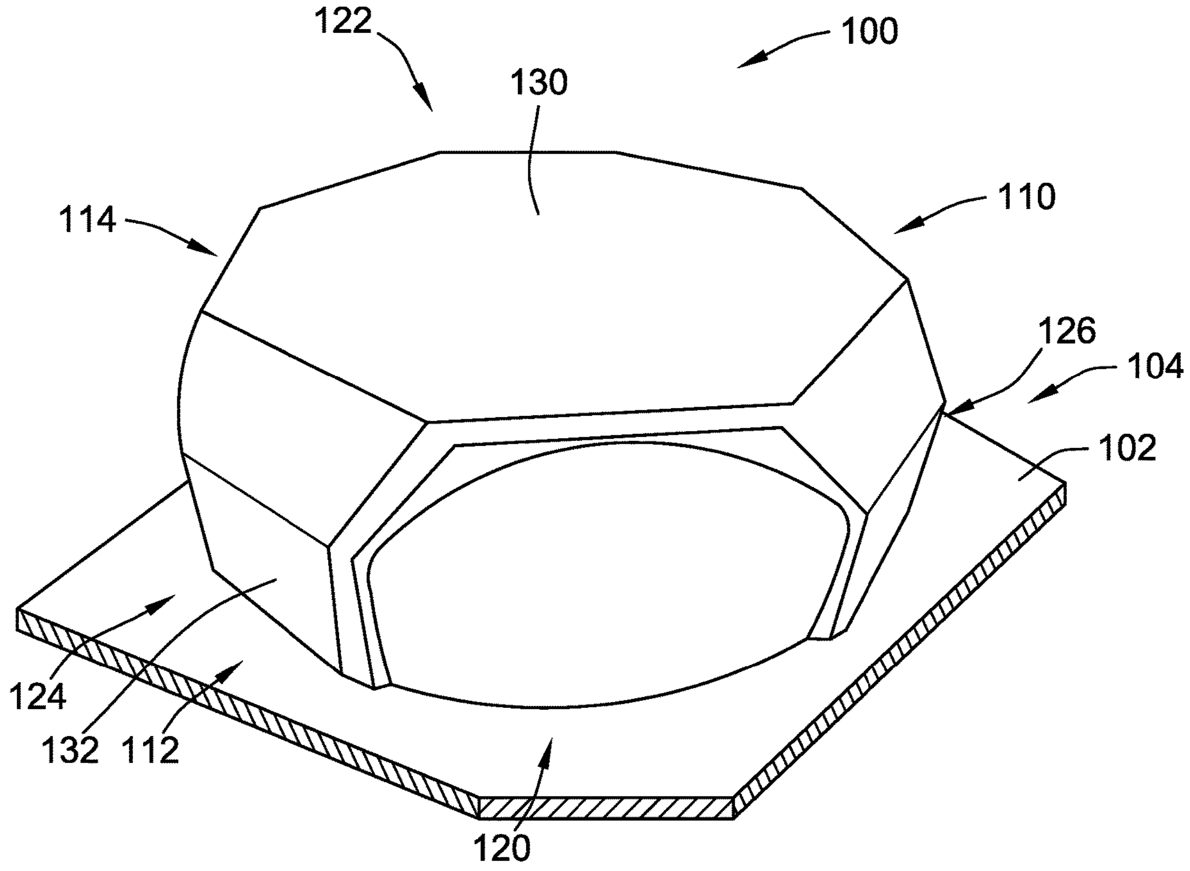
FIG. 1 illustrates a multiband vehicle rooftop antenna assembly in accordance with an exemplary embodiment.
Figure 2:
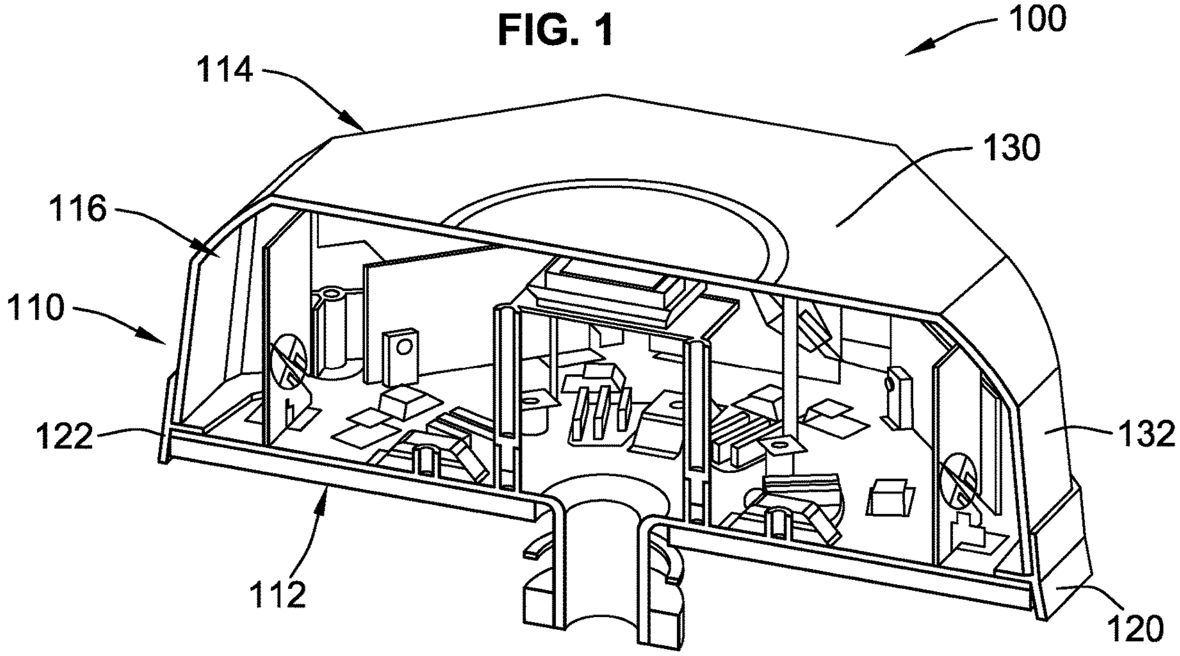
FIG. 2 is a sectional view of a portion of the multiband vehicle rooftop antenna assembly in accordance with an exemplary embodiment.

FIG. 1 illustrates a multiband vehicle rooftop antenna assembly 100 in accordance with an exemplary embodiment. FIG. 2 is a sectional view of a portion of the multiband vehicle rooftop antenna assembly 100 in accordance with an exemplary embodiment. The multiband vehicle rooftop antenna assembly 100 is installed on a rooftop 102 of a vehicle 104. The multiband vehicle rooftop antenna assembly 100 may be referred to herein after as antenna assembly 100.

Antenna assembly 100 integrates multiple antenna elements into a common structure mounted to vehicle 104 for a multiband antenna automotive/vehicle system. For example, antenna assembly 100 may include cellular, Wi-Fi, Dedicated Short Range Communication (DSRC), Bluetooth Low Energy (BLE), CBRS and satellite antennas to provide versatility in communication for vehicle 104. In various embodiments, the antenna assembly 100 may be operable over one or more cellular frequencies (for example, 4G, 5G, Long Term Evolution (LTE), Citizen Broadband Radio Services (CBRS), Licenses Assisted Access (LAA) and the like), operable over Wi-Fi frequencies, operable over terrestrial frequencies (for example, amplitude modulation (AM), frequency modulation (FM), and the like), operable over DSRC frequencies for “vehicle to everything” communication, operable over one or more satellite signals (e.g., Satellite Digital Audio Radio (SDARS), Global Navigation Satellite System (GNSS), and the like). The antenna assembly 100 may include antenna elements operable in other frequencies. The antenna elements of antenna assembly 100 are arranged to avoid (or at least reduce) mutual coupling or interference and/or degradation of signals between the various antenna elements.

The antenna assembly 100 includes an antenna housing 110 holding the antenna components. The antenna housing 110 includes an antenna base 112 and a cover or radome 114 coupled to the antenna base 112. The antenna base 112 and the radome 114 form an interior enclosure 116 that placed the antenna components. Optionally, some antenna components may be placed within and/or below antenna base 112, such as circuit boards, cables, and the like. In an exemplary embodiment, the antenna elements are located above the antenna base 112, under the radome 114, inside the interior enclosure 116. The antenna elements may be mounted to the antenna base 112 and covered by the radome 114. Optionally, at least one of the antenna elements may extend through the radome 114 to the exterior of the interior enclosure.

The antenna housing 110 extends between a front 120 and a rear 122. The antenna housing 110 extends along a primary axis between the front 120 and the rear 122. The antenna housing 110 has a first or right side 124 and a second or left side 126. The antenna housing 110 extends along a secondary or lateral axis between the right side 124 and the left side 126. In an exemplary embodiment, the antenna housing 110 has a generally circular outer perimeter 128. In alternative embodiments, rather than being circular, the antenna housing 110 may be oblong, such as being oval shaped (for example, being longer along the primary axis than the secondary axis). The radome 114 is designed to have a dome shape or a puck shape. In other various embodiments, the antenna housing 110 may be angular, such as being octagonal rather than circular and including planar edges at the front/rear/sides and at connecting segments there between. The radome 114 has a top 130, which may be domed or may be flat, and a side wall 132 extending from the top 130 to the antenna base 112. The side wall 132 is curved into the dome shape and surrounds the outer perimeter 128. The top 130 may be at the centroid. In various embodiments, the radome 114 may have a maximum height relative to the rooftop 102 of the vehicle 104 of approximately 80 mm. In other various embodiments, the radome 114 may be shorter, such as having a maximum height relative to the rooftop 102 of the vehicle 104 of approximately 60 mm.

Figure 3:
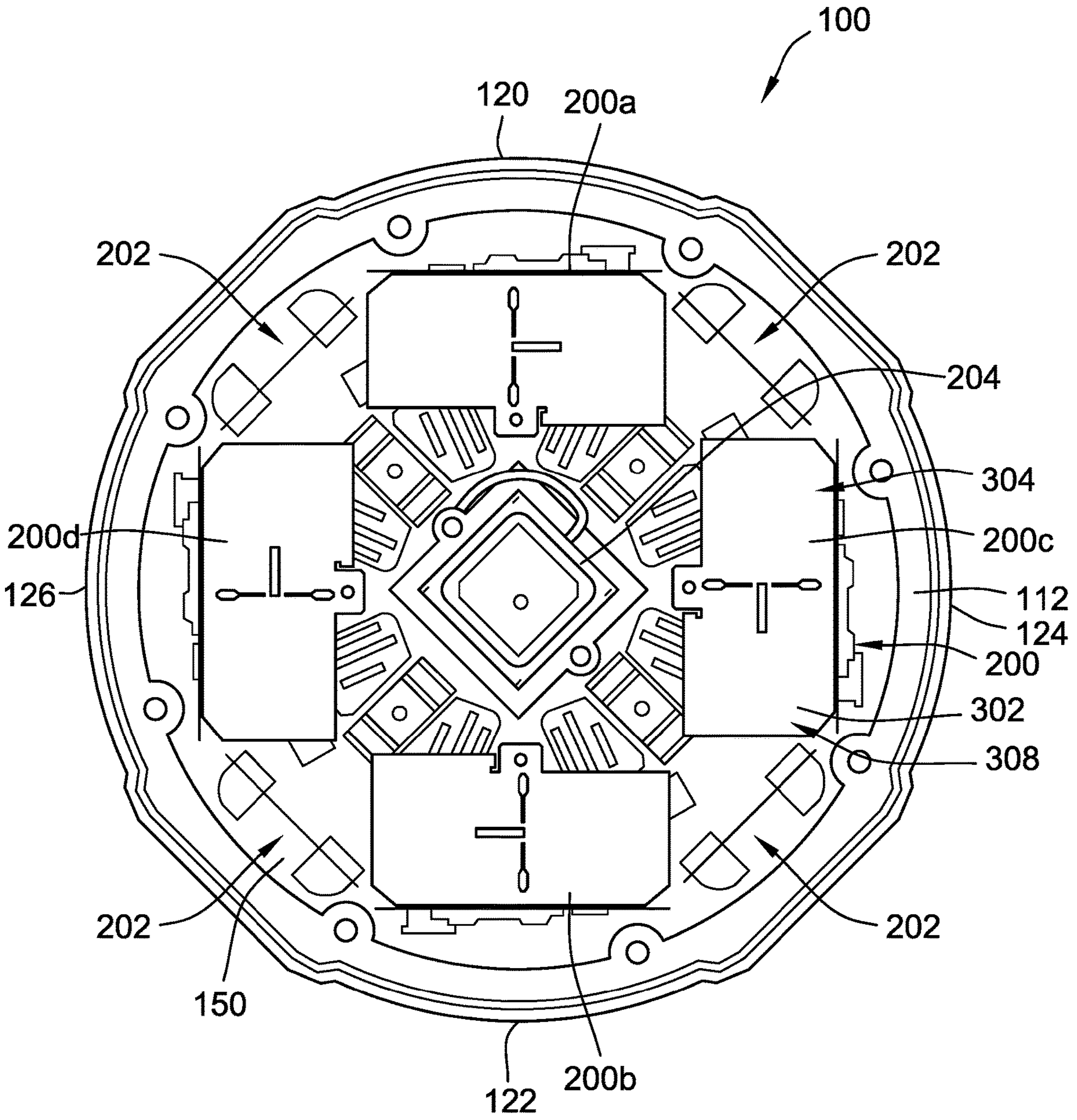
FIG. 3 is a top view of a portion of the antenna assembly illustrating components of the antenna assembly in accordance with an exemplary embodiment.
Figure 4:
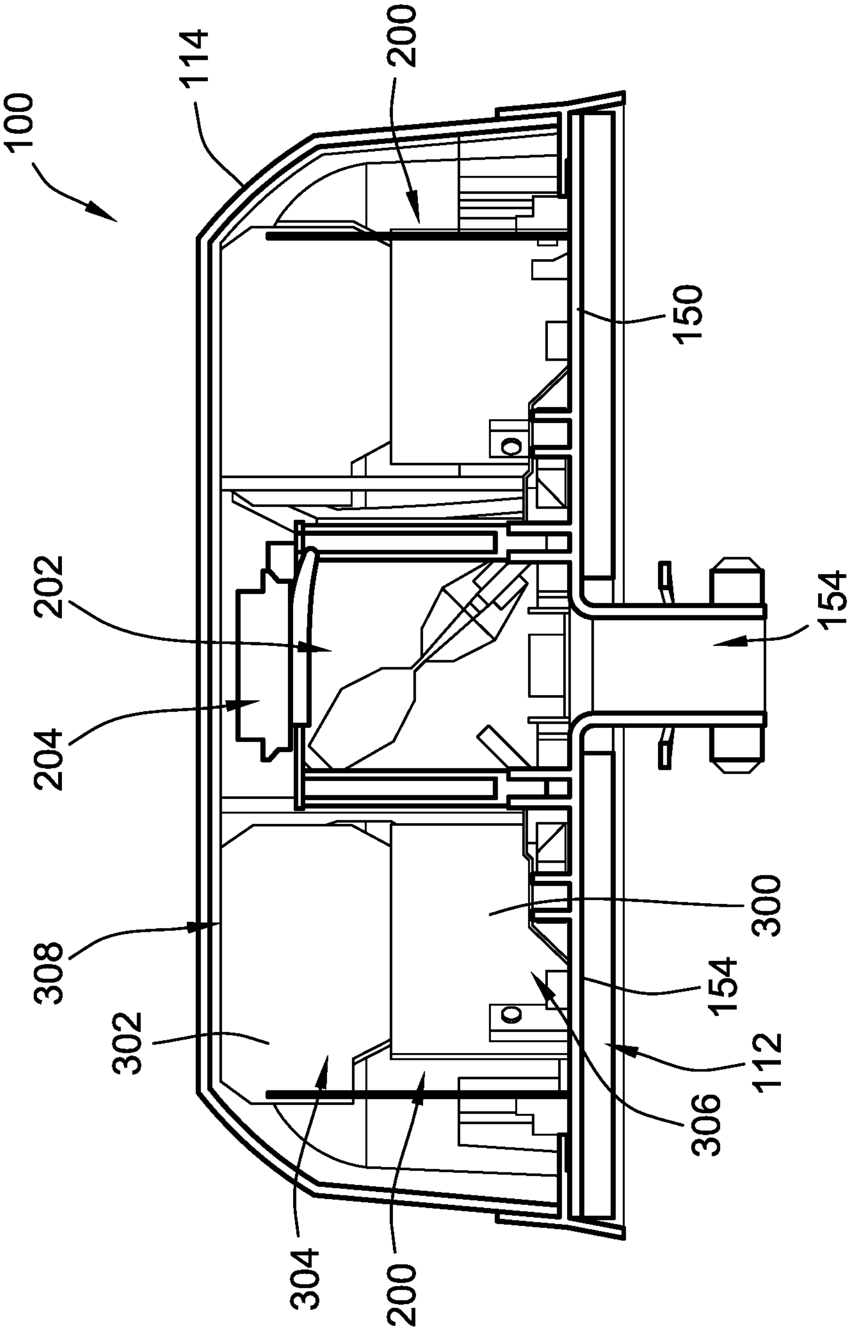
FIG. 4 is a side view of a portion of the antenna assembly illustrating components of the antenna assembly in accordance with an exemplary embodiment.
Figure 5:
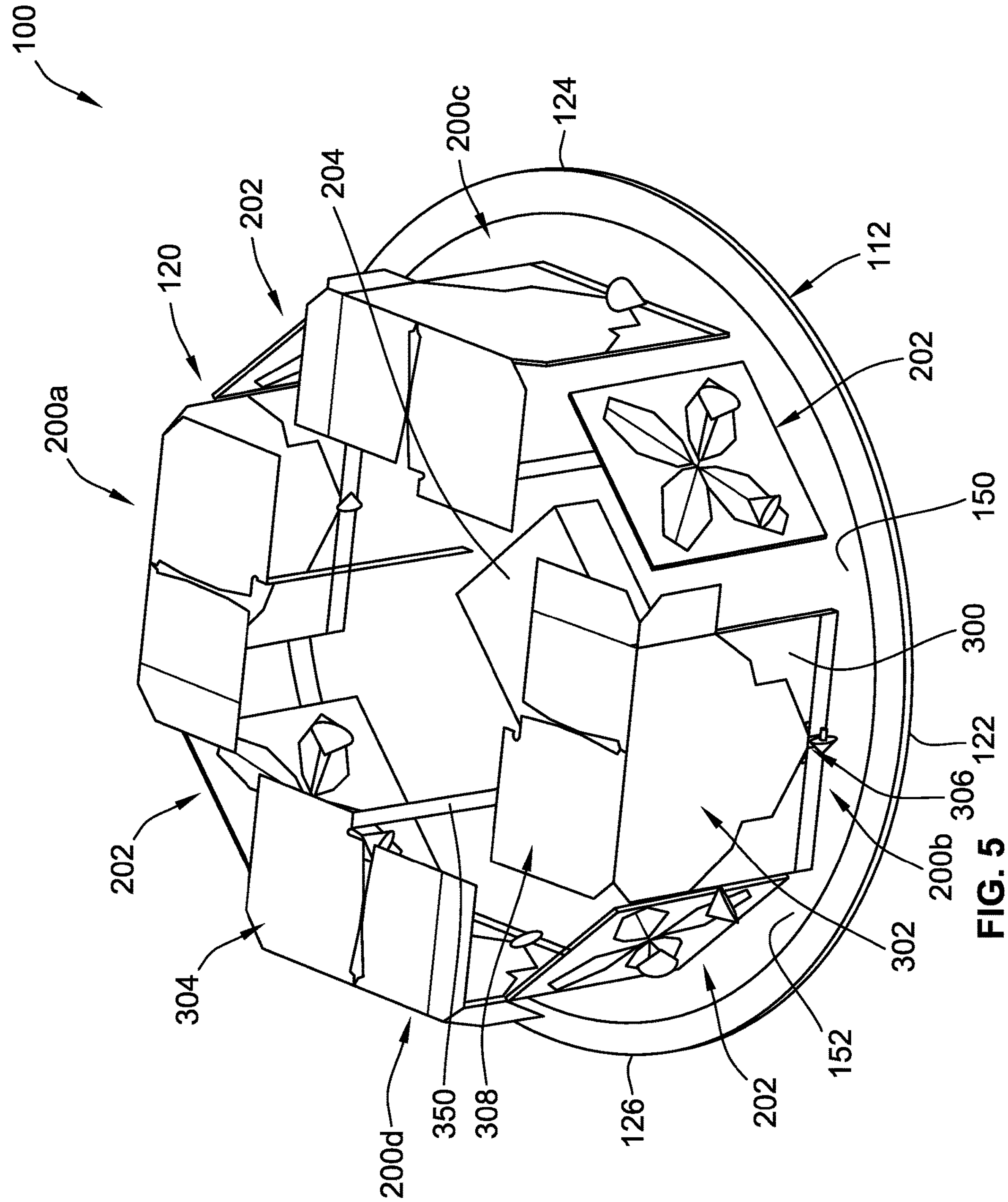
FIG. 5 is a perspective view of a portion of the antenna assembly illustrating components of the antenna assembly in accordance with an exemplary embodiment.

FIG. 3 is a top view of a portion of the antenna assembly 100 illustrating components of the antenna assembly 100. FIG. 4 is a cross section side view of a portion of the antenna assembly 100 illustrating components of the antenna assembly 100. FIG. 5 is a perspective view of a portion of the antenna assembly 100 illustrating components of the antenna assembly 100. The antenna assembly 100 is shown in FIGS. 3 and 5 without the radome 114 (FIG. 2) to illustrate the antenna elements.

In an exemplary embodiment, the antenna base 112 includes a substrate 150. The antenna elements may be mounted to substrate 150. For example, the substrate 150 may support the antenna elements. In the illustrated embodiment, the substrate 150 is circular. However, substrate 150 may have other shapes in alternative embodiments, such as being obround, oval, octagonal, rectangular, and the like. In various embodiments, the substrate 150 is a metal plate. For example, the substrate 150 may be a die-cast component. Substrate 150 may be mounted to vehicle 104, such as to rooftop 102 of vehicle 104. In an exemplary embodiment, the substrate 150 includes and/or defines a ground plane 152 to provide a ground reference for the antenna elements. The ground plane 152 may be at the bottom and/or the top and/or at another layer. In various embodiments, the ground plane 152 may be a stamped part that has good solderability feature or a circuit board having one or more circuits, such as a ground circuit with matching network to feed the antenna elements. In various embodiments, ground plane 152 allows a plane to hold the antenna elements by soldering feature. For example, the antenna elements may be soldered to circuits or conductors of the circuit board. Alternatively, the feeds for the antenna elements may be provided by feed cables passing through substrate 150, such as through an opening 154.

In an exemplary embodiment, the antenna assembly 100 includes a plurality of cellular antennas 200 configured to be operable over one or more cellular frequencies, a plurality of Wi-Fi antennas 202 configured to be operable over one or more Wi-Fi frequencies, and a satellite antenna 204 configured to be operable over one or more satellite frequencies. The plurality of these antennas is designed for Multiple Input Multiple Output or Diversity system. Other types of antenna elements may be provided in alternative embodiments operable in other target frequencies. The antennas 200, 202, 204 are mounted to antenna base 112, such as to the substrate 150. In an exemplary embodiment, the cellular antennas 200 are monopole antennas. In an exemplary embodiment, Wi-Fi antennas 202 are dipole antennas; however, the Wi-Fi antennas 202 may be monopole antennas or other types of antennas in alternative embodiments. In the illustrated embodiment, the Wi-Fi antennas 202 are standalone Wi-Fi antennas mounted to the antenna base 112 separate from the cellular antennas 200. However, in alternative embodiments, one or more of the Wi-Fi antennas 202 may be integrated Wi-Fi antennas integrated with the cellular antennas 200. The satellite antenna 204 may be a right hand circular polarized patch antenna with ready Low Noise Amplifier (LNA) module.

In an exemplary embodiment, feeding cables 210 are fed to the antenna elements. The feeding cables 210 may be coaxial cables. The feed cables 210 pass through the opening 154 in substrate 150 for connection to the corresponding antenna elements.

In an exemplary embodiment, the cellular antennas 200 are multiple-in, multiple-out (MIMO) antenna elements that cover wide frequency bands. Optionally, all of the cellular antennas 200 may be identical. However, in alternative embodiments, one or more of the cellular antennas 200 may be different (such as shaped differently) to target different frequencies. In an exemplary embodiment, the cellular antennas 200 are arranged along the outer perimeter 128 at intervals. Optionally, the cellular antennas 200 may be spaced equidistant from each other and space as far as possible to achieve the lowest mutual coupling to each other. In the illustrated embodiment, four of the cellular antennas 200 are placed and arranged at 90° orientations from each other. In alternative embodiment, the number of cellular antennas is not limited to four but can be configured to two, three, four, five and more depending on the available space and requirement of the system. A first cellular antenna **200*a* is provided at the front 120. A second cellular antenna 200*b* is provided at the rear 122. The first and second cellular antennas 200*a* and 200*b* are primary cellular antennas arranged along the primary axis. The first and second cellular antennas 200*a*, 200*b* face in opposite directions. A third cellular antenna 200*c* is provided at the right side 124. A fourth cellular antenna 200*d* is provided at the left side 126. The third and fourth cellular antennas 200*c*, 200*d* are secondary cellular antennas arranged along the secondary axis. The third and fourth cellular antennas 200*c*, 200*d* face in opposite directions. The third and fourth cellular antennas 200*c*, 200*d* are oriented perpendicular to the first and second cellular antennas 200*a*, 200*b***.

In an exemplary embodiment, the Wi-Fi antennas 202 are mounted to the antenna base 112 offset from the cellular antennas 200. For example, the Wi-Fi antennas 202 may be located between the cellular antennas 200. In an exemplary embodiment, the Wi-Fi antennas 202 are located at the outer perimeter 128 of the antenna housing 110. The Wi-Fi antennas 202 may be oriented transverse to the cellular antennas 200. For example, the Wi-Fi antennas 202 may be oriented at approximately 45° relative to the cellular antennas 200. The cellular antennas 200 and the Wi-Fi antennas 202 form a ring around the outer perimeter 128. Other locations are possible in alternative embodiments. Greater or fewer Wi-Fi antennas 202 may be provided in alternative embodiments depending on the particular application and needs. The antenna base 112 provides multiple mounting locations for the various antenna elements.

In an exemplary embodiment, GNSS/GPS satellite antenna 204 is placed at the center of antenna assembly 100, such as at the centroid. GNSS/GPS satellite antenna 204 may be centered between the first and second cellular antennas 200*a*, 200*b*. GNSS/GPS Satellite antenna 204 may be centered between the third and fourth cellular antennas 200*c*, 200*d*. However, other locations are possible in alternative embodiments. Satellite antenna 204 may be mounted directly to antenna base 112. In alternative embodiments, GNSS/GPS satellite antenna 204 may be elevated above antenna base 112, such as near the top of the radome 114. For example, standoffs 118 are used to hold GNSS/GPS satellite antenna 204 at an elevated position. The height of the elevated position need to be configured for minimal impact to other cellular or Wi-Fi antenna.

In an exemplary embodiment, the cellular antennas 200 cover a broad frequency range to meet bandwidth requirements, such as to cover the 4G cellular network and/or the 5G cellular network and/or the LTE cellular network. For example, the cellular antennas 200 may cover a frequency range from approximately 617 MHz to 7125 MHz. In various embodiments, the cellular antennas 200 may be designed for targeted operation in both the 617-960 MHz range and the 1690-7125 MHz range. In an exemplary embodiment, the Wi-Fi antennas 202 may be used for Wi-Fi communication and/or Bluetooth communication in and around the vehicle. In various embodiments, the Wi-Fi antennas 202 may cover one or more frequency ranges, such as a frequency range from approximately 2400-2500 MHz and/or 4900-7125 MHz. The Wi-Fi antenna 202 may cover the Bluetooth Low Energy 2.4 GHz-2.48 GHz frequency range. In an exemplary embodiment, GNSS/GPS satellite antenna 204 is used for satellite positioning, such as for use with a GNSS/GPS system of the vehicle. The GNSS/GPS satellite antenna 204 may be a dual band (L1 and L5) antenna element. The satellite antenna 204 may have a low axial ratio to provide high precision positioning for assisted driving and self-driving. In an exemplary embodiment, GNSS/GPS satellite antenna 204 may be used for satellite radio. In various embodiments, GNSS/GPS satellite antenna 204 may cover one or more frequency ranges, such as a frequency range from approximately 1559.052-1607 MHz and/or 1166-1186 MHz. In an exemplary embodiment, the antenna elements may be used for communication with the surroundings, such as vehicle-to-vehicle communication, vehicle-to-infrastructure communication, vehicle-to-pedestrian communication, and the like.

The cellular antenna 200 is configured to be operable for receiving and/or transmitting communication signals within one or more cellular frequency bands (for example, 4G, 5G, Long Term Evolution (LTE), and the like). In an exemplary embodiment, the cellular antenna 200 includes a dielectric support 300 and an antenna element 302 coupled to the dielectric support 300. The dielectric support 300 is coupled to the antenna base 112, such as to the substrate 150. The dielectric support 300 may be a circuit board. In various embodiments, the antenna element 302 includes a stamped and formed part coupled to the dielectric support 300. Optionally, at least a portion of the antenna element 302 may be a circuit element of the circuit board of the dielectric support 300. In other alternative embodiments, the cellular antenna 200 is provided without the dielectric support 300, such as having a stamped and formed conductor structure that is self-supporting and free-standing.

In an exemplary embodiment, the cellular antennas 200 and the Wi-Fi antennas 202 are pushed outward toward the outer perimeter 128 to increase the spacing between the antenna elements to reduce mutual coupling/interference. Cellular antennas 200 and the Wi-Fi antennas 202 are placed near the side wall 132 of the radome 114. In an exemplary embodiment, the side wall 132 extends nearly vertically to quickly increase the height and the volume in the interior enclosure 116, which allows the cellular antennas 200 and the Wi-Fi antennas 202 to be located close to the outer perimeter 128. The shapes of the cellular antenna 200 and the Wi-Fi antennas 202 are designed to fit in the space provided within interior enclosure 116. For example, the antenna elements are as tall as practical and may include chamfered surfaces or bends/folds to fit in the space provided.

In an exemplary embodiment, the antenna element 302 includes a monopole 304 having a feed portion 306 at a bottom of the monopole 304 and an upper portion 308 at a top of the monopole 304. The upper portion 308 is top loaded. The upper portion 308 includes multiple sections to add additional length to the monopole 304. The sections are folded or bent into a non-planar shape. The upper portion 308 uses width to gain length within a given height of the cellular antenna 200. In an exemplary embodiment, the upper portion 308 may be grounded to the ground plane 152, such as using a shorting leg extending down to the ground plane 152. In an exemplary embodiment, the feed portion 306 is stepped inward at the bottom to a feed point. The feed portion 306 may include one or more slanted/curve edges between the steps. The feed point may be approximately centered along the cellular antenna 200. Feed portion 306 may include shorting elements and/or matching elements along the circuit board.

In an exemplary embodiment, the antenna base 112 of antenna assembly 100 has a footprint defined by the outer perimeter 128. The antenna elements are positioned close to each other to fit within the footprint. The antenna elements are positioned relative to each other such that there is sufficient de-correlation, sufficiently low coupling, and sufficient isolation between the antenna elements. The antenna elements are positioned relative to each other to fit within the radome 114 (for example, within the dome shape of the radome 114). For example, placement of the antenna elements is positioned based on height, width, and length dimensions of the antenna elements to fit within the interior enclosure of the radome 114 while limiting matching or coupling between the antenna elements for efficient operation of the various antenna elements.

Figure 6:
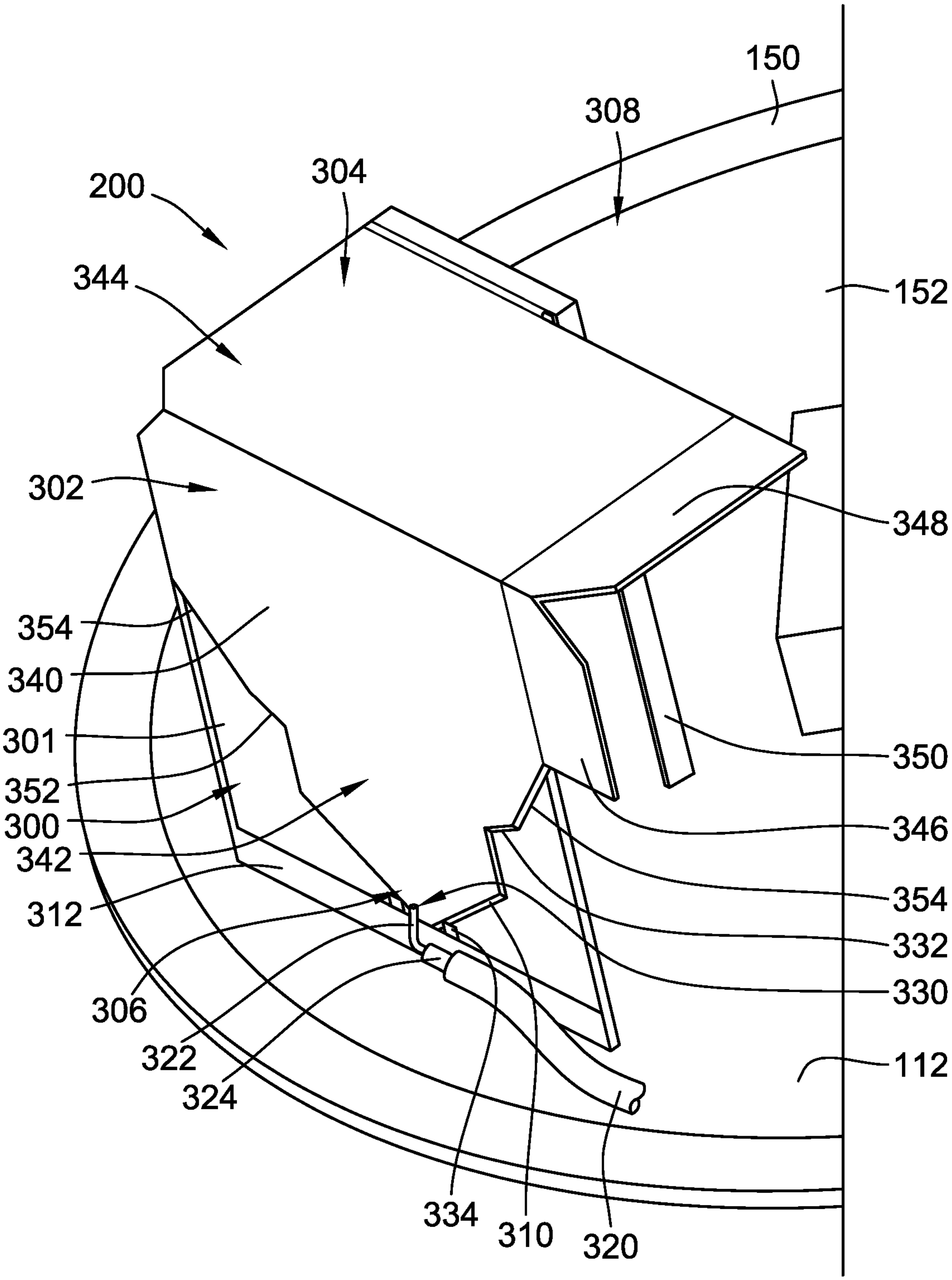
FIG. 6 is a perspective view of a portion of the antenna assembly showing the cellular antenna in accordance with an exemplary embodiment.

FIG. 6 is a perspective view of a portion of the antenna assembly 100 showing the cellular antenna 200 in accordance with an exemplary embodiment. The cellular antenna 200 includes the dielectric support 300 and the antenna element 302 coupled to the dielectric support 300. In an exemplary embodiment, the antenna element 302 includes multiple branches or sections arranged to cover different frequency bands.

In an exemplary embodiment, the dielectric support 300 includes a circuit board 301. However, in alternative embodiments, the dielectric support 300 may be a formed dielectric part or an overmolded part that is devoid of circuits or conductors but rather is only used for mechanical support of the antenna element 302. The dielectric support 300 may support the antenna element 302 relative to the substrate 150. The dielectric support 300 provides a mounting interface to the circuit substrate 150. In the illustrated embodiment, the dielectric support 300 is provided at the bottom of the cellular antenna 200 and the antenna element 302 extends upward beyond the top of the dielectric support 300. However, in alternative embodiments, the dielectric support 300 may extend the entire height of the cellular antenna 200. In the illustrated embodiment, the dielectric support 300 is rectangular in shape with a bottom edge of the dielectric support 300 resting on the substrate 150. However, the dielectric support may have other shapes in alternative embodiments. In various embodiments, the dielectric support 300 is oriented vertically, such as perpendicular to the substrate 150. In an exemplary embodiment, the antenna element 302 is isolated from the ground plane 152, such as by the dielectric support 300. For example, the dielectric support 300 may hold the antenna element 302 at a suspended or elevated position relative to the substrate 150 and the ground plane 152.

In an exemplary embodiment, circuit board 301 includes a feed circuit 310 and a ground circuit 312. The circuit board 301 may include one or more shorting circuits to the ground circuit 312 and/or the ground plane 152. The circuit board 301 may include more circuits in various embodiments. The stamped and formed upper portion 308 of the monopole 304 is connected to the feed circuit 310, such as being welded, soldered, riveted, or otherwise electrically connected to the feed circuit 310. The stamped and formed upper portion 308 extends upward from the upper edge of circuit board 301.

The feed circuit 310 and the ground circuit 312 are provided at feed portion 306 of the cellular antenna 200. The feed circuit 310 and the ground circuit 312 may be defined by traces, vias or other circuits of the circuit board 301. A feed cable 320 is electrically connected to the feed portion 306. For example, the feed cable 320 is electrically connected to the feed circuit 310 and the ground circuit 312. In an exemplary embodiment, a center conductor 322 of the feed cable 320 is connected to the feed circuit 310, such as being soldered to the feed circuit 310. A cable shield 324 of the feed cable 320 is connected to the ground circuit 312, such as being soldered to the ground circuit 312. Ground circuit 312 may be electrically connected to ground plane 152 of substrate 150. In the illustrated embodiment, ground circuit 312 is near the bottom edge of circuit board 301. The ground circuit 312 may be oriented vertically. In the illustrated embodiment, the feeding cable 320 is connected to the feed circuit 310 and the ground circuit 312 near a central location of the circuit board 301, such as approximately centered between a front edge and a rear edge of the circuit board 301. Other locations are possible in alternative embodiments. Optionally, the circuit board 301 may include a slot that receives the feed cable 320, such as to recess the feed cable 320 into the circuit board 301 to align the center conductor 322 with the surface of the circuit board 301 for improved performance.

In an exemplary embodiment, the feed circuit 310 emanates from the central location of circuit board 301. For example, the feed circuit 310 may have a feed point 330 approximately centered between the front edge and the rear edge of the circuit board 301. The center conductor 322 is connected to feed circuit 310 at feed point 330. The center conductor 322 and the feed circuit 310 at the feed point 330 have a smaller area to increase the inductance to balance the capacitive loading of the large area of the monopole radiating element. In an exemplary embodiment, circuit board 301 has a masking layer at the feed point 330 masking the center conductor 322 from the ground circuit 312. Feed circuit 310 includes steps 332 extending outward from the feed point 330 toward the front and rear edges of the circuit board 301. Optionally, steps 332 may have slanted/curve edges along portions of steps 332. The slanted edges along the multiple steps 332 may offer flexibility for optimization for wide bandwidth. In an exemplary embodiment, matching studs 334 may extend between the feed circuit 310 and the ground circuit 312. The matching studs 334 are located relative to the feed point 330 to control capacitance and inductance along the monopole radiating element to improve one or more antenna characteristics of the cellular antenna 200 especially for higher frequency range.

In an exemplary embodiment, cellular antenna 200 includes a stamped and formed, monopole radiating element 340 (also referred to hereinafter as a radiator 340) that is coupled to the circuit board 301. For example, the radiating element 340 is connected to feed circuit 310. The radiating element 340 is formed from a metal plate that is stamped and formed into a particular shape. In an exemplary embodiment, the radiating element 340 includes a connecting segment 342 connected to the circuit board 301, an extension segment 344 extending from the connecting segment 342 and bent out of plane from the connecting segment 342, stubs 346, 348 extending from the connecting segment 342 and the extension segment 344, respectively. In an exemplary embodiment, the radiating element 340 includes a shorting leg 350 extending from the extension segment 344 to the ground plane 152. The extension segment 344 defines the upper portion 308 of the monopole 304. The size and shape of the radiating element 340 may be designed to occupy an effective value for controlling bandwidth, efficiency, and providing a longer electrical length for the radiating element 340. In an exemplary embodiment, the radiating element 340 is asymmetrical, being sized and shaped to fit within the dome/puck shape of the radome 114. The upper portion 308 of the monopole 304 is top loaded to give a long electrical path. In an exemplary embodiment, the upper portion 308 is shorted to the ground plane 152 by a shorting path, such as the shorting leg 350 that is stamped from the upper portion 308 and tied directly to the ground plane 152 (or the ground circuit 312). The shorting path may improve matching of the antenna, such as for the lower edge frequency band (for example, 617 MHz) to maintain a lower profile compared to conventional monopole antennas.

In an exemplary embodiment, the connecting segment 342 extends generally vertically. The connecting segment 342 extends between opposite sides of the antenna. The connecting segment 342 is located at the bottom of the radiating element 340. The connecting segment 342 is configured to overlap a portion of the feed circuit 310. For example, the connecting segment 342 may extend along one side of the circuit board 301 for mechanical and electrical connection to the feed circuit 310. In various embodiments, the connecting segment 342 may be connected to the circuit board 301 using a fastener, such as a threaded fastener, a rivet, or other type of fastener. In various embodiments, the connecting segment 342 may be soldered to the feed circuit 310. The connecting segment 342 includes one or more steps 352 that correspond with the steps 332 of the feed circuit 310. The steps 352 may include slanted/curve edges 354 defining portions of the steps 352. The steps 352 are provided at the sides of the connecting segment 342 to increase the size of the connecting segment 342 as the antenna transitions from the feed portion 306 to the upper portion 308. The angles and lengths of the slanted/curve edges 354 are selected to target operation in one or more frequencies. The stub 346 extends from one side of the connecting segment 342. The stub 346 extends beyond the edge of the circuit board 301. Optionally, stubs 346 may be provided at both sides. The stubs 346 may include chamfered edges, such as to fit within the radome 114.

The extension segment 344 extends from the connecting segment 342, such as at a bend line. In an exemplary embodiment, the extension segment 344 is bent approximately perpendicular to the connecting segment 342. For example, the extension segment 344 may be oriented generally horizontally. In various embodiments, the extension segment 344 is located above the circuit board 301. Optionally, the extension segment 344 may rest on the upper edge of the circuit board 301. As such, the circuit board 301 supports the radiating element 340. In the illustrated embodiment, the extension segment 344 is rectangular in shape in the illustrated embodiment, however, the extension segment 344 may have other shapes in alternative embodiments. The extension segment 344 increases an overall length of the radiating element 340 without increasing the height of the radiating element 340. For example, the extension segment 344 lengthens the monopole 304. The extension segment 344 may extend the entire width of the radiating element 340, such as between the opposite sides of the radiating element 340. The stub 348 extends from one side of the extension segment 344. The stub 348 extends beyond the edge of the circuit board 301. Optionally, stubs 348 may be provided at both sides. The stubs 348 may include chamfered edges, such as to fit within the radome 114. In various embodiments, the extension segment 344 may include a wrapped segment extending from an edge. The wrapped segment may be U-shaped or C-shaped, such as being folded over into a parallel, overlapping orientation relative to the main body of the extension segment 344. The wrapped segment may add length to the radiating element 340 without increasing the overall height of the radiating element 340.

The shorting leg 350 extends from the inner edge of the extension segment 344, such as being stamped from the inner edge and bend downward from the inner edge to the antenna base 112. The shorting leg 350 provides a shorting path between the monopole radiating element and the ground, such as the ground circuit 312 and/or the ground plane 152. The shorting leg 350 may enhance matching of the lower profile and the upper profile of the monopole radiating element. In the illustrated embodiment, the shorting leg 350 is stamped and formed from the upper portion. The shorting leg 350 may be supported by the circuit board 301, such as extending along the rear edge of the circuit board 301. Alternatively, the shorting leg 350 may be remote from the circuit board 301 and terminated directly to the antenna base 112. The shorting leg 350 may be approximately centered (side-to-side) relative to the antenna element. The shorting leg 350 may be aligned with the feed point.

Figure 7:
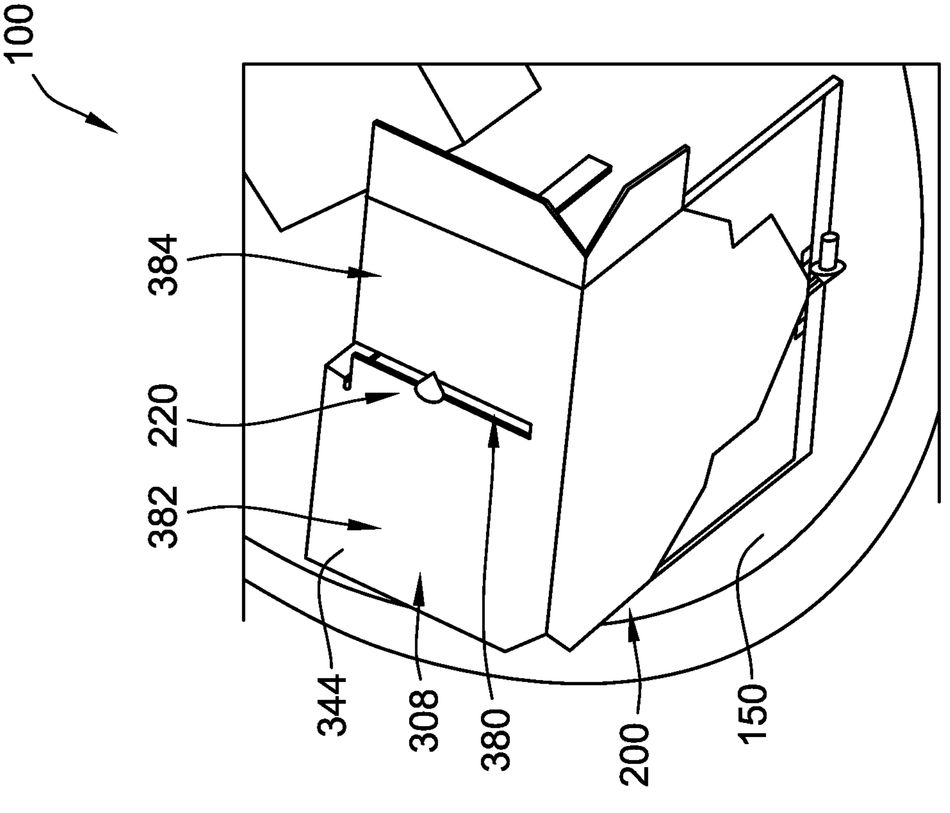
FIG. 7 is a perspective view of a portion of the antenna assembly showing the cellular antenna in accordance with an exemplary embodiment.

FIG. 7 is a perspective view of a portion of the antenna assembly 100 showing the cellular antenna 200 in accordance with an exemplary embodiment. The cellular antenna 200 includes an integrated BLE/WIFI open slot antenna 220 that operates at 2.4-2.5 frequency range integrated into the cellular antenna 200. The integrated BLE/WI-FI open slot antenna 220 defines one of the BLE/WIFI open slot antennas 202 of the antenna assembly 100. The integrated BLE/WIFI open slot antenna 220 provides a BLE/WIFI open slot antenna without needing an additional structure mounted to the antenna base, thus providing an additional antenna element without occupying real estate on the antenna base. The addition of the integrated BLE/WIFI open slot antenna 220, integrated into the cellular antenna 200, saves cost and manufacturing processes to reduce the overall cost of the antenna assembly 100. In an exemplary embodiment, a separate feed cable (not shown) may be coupled to the integrated Wi-Fi antenna 220 to operate the integrated BLE/WIFI open slot antenna 220.

The integrated Wi-Fi open tapering slot antenna 220 is integrated into the upper portion 308 of the cellular antenna 200. The upper portion 308 includes an opening or slot 380 that separates the upper portion 308 into a first branch 382 and a second branch 384 on opposite sides of the slot 380. In the illustrated embodiment, the slot 380 is open at the inner edge of the extension segment 344 and extends outward toward the outer edge of the extension segment 344. The slot 380 is used to excite the additional resonance as additional antenna (2.4-2.5 GHZ and 4.9-7.125 GHZ) to the cellular antenna 200. Providing the integrated Wi-Fi antenna 220 at the top of the top loaded structure (for example, at the upper portion 308) reduces mutual coupling of the integrated Wi-Fi antenna 220 toward a particular operating frequency. Feed cable are configured to be coupled to the integrated Wi-Fi antenna 220 at the slot 380. For example, the feed cable may be routed through the substrate 150 to the elevated position of the integrated Wi-Fi antennas 220. The positioning and shape of the slot 380 controls the characteristics of the integrated Wi-Fi antenna 220. For example, the width of the slot 380 may control the integrated Wi-Fi antenna 220 by controlling the positioning of the first branch 382 relative to the second branch 384. In the illustrated embodiment, the slot 380 is rectangular having parallel sides. Other shapes are possible in alternative embodiments. The positioning of the slot 380 controls the shape of the first branch 382 and the shape of the second branch 384. For example, in the illustrated embodiment, the slot 380 is approximately centered between the sides of the upper portion 308 such that the first and second branches 382, 384 are similar in size. The slot 380 may be located at other positions in alternative embodiments, such that the branches 382, 384 have different widths. The cellular antenna 200 may include multiple slots 380 in alternative embodiments to form multiple integrated Wi-Fi antennas 220, which may be operable at different frequencies.

Figure 8:
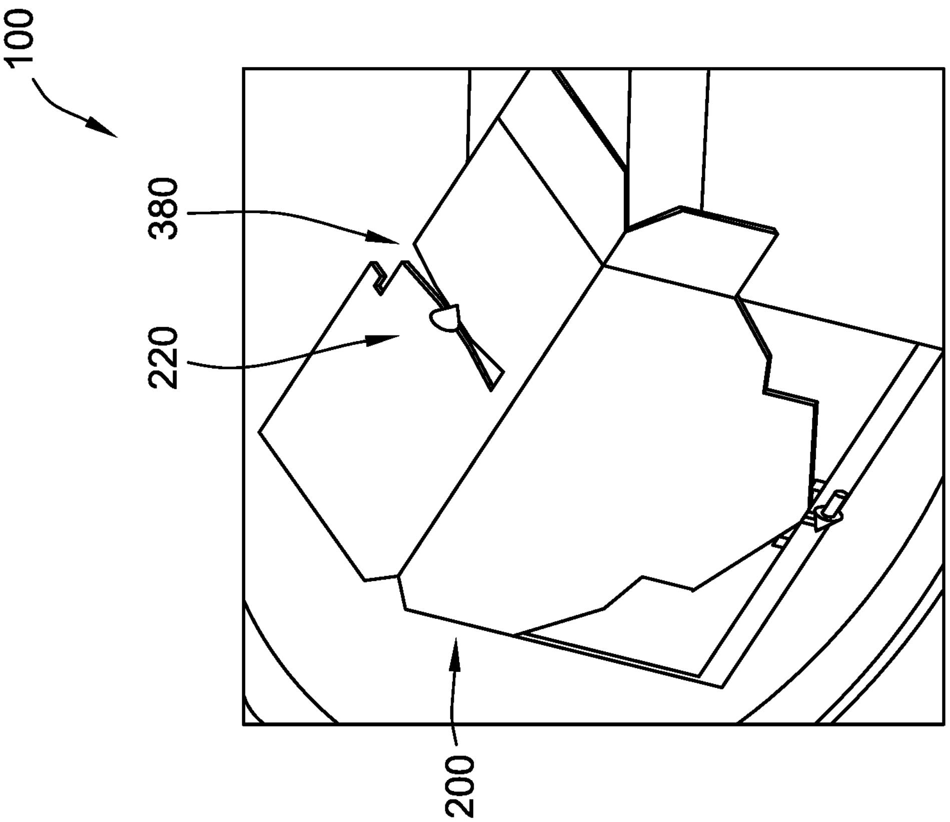
FIG. 8 is a perspective view of a portion of the antenna assembly showing the cellular antenna in accordance with an exemplary embodiment includes integrated Wi-Fi into the upper portion of the monopole of the corresponding cellular antenna.

FIG. 8 is a perspective view of a portion of the antenna assembly 100 showing the cellular antenna 200 in accordance with an exemplary embodiment. The cellular antenna 200 includes the slot 380 defining the integrated Wi-Fi antenna 220 integrated into the cellular antenna 200. In the illustrated embodiment, the slot 380 is hourglass or bow-tie shaped. For example, the sides of the slot 380 are non-linear and non-parallel to each other. The width of the slot 380 is variable, such as being narrower at a central portion of the slot 380 and wider at the ends of the slot 380. The shape of slot enable wider operating frequency range compared to the simple rectangular slot.

Figure 9:
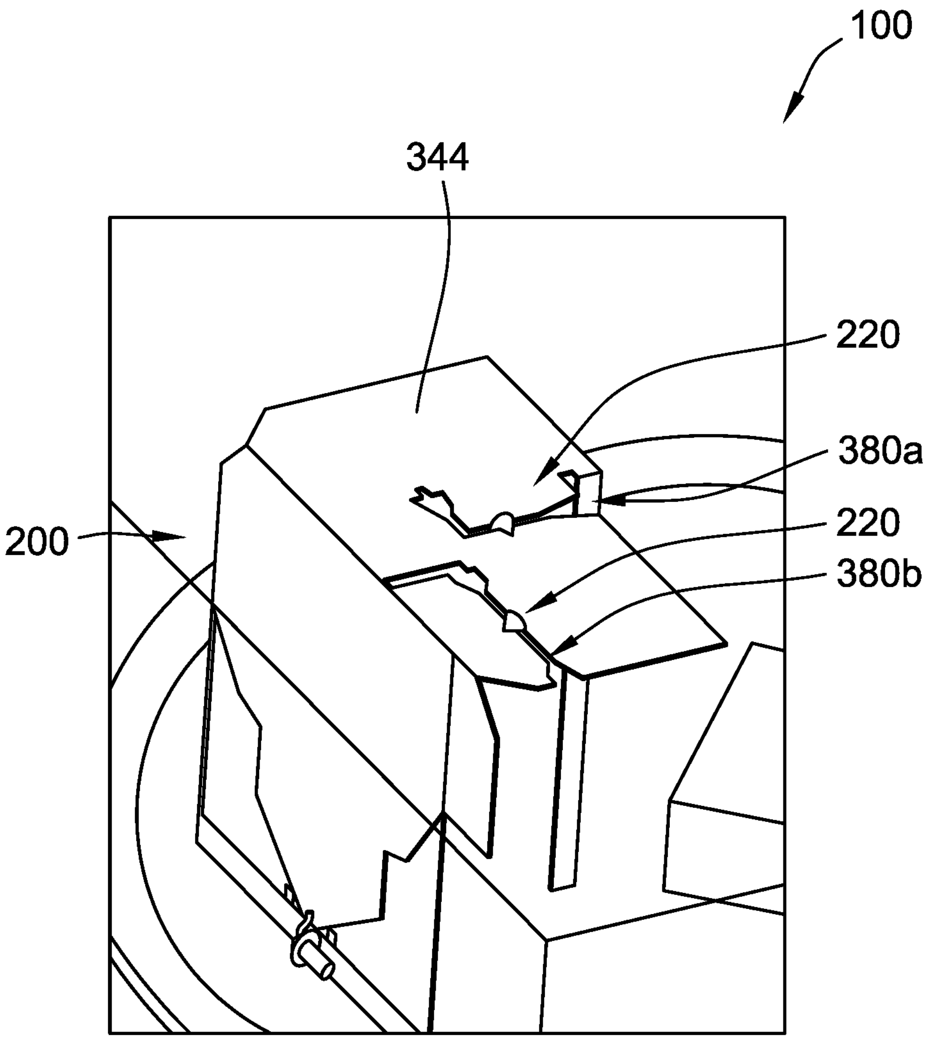
FIG. 9 is a perspective view of a portion of the antenna assembly showing the cellular antenna in accordance with an exemplary embodiment includes integrated multiple Wi-Fi into the upper portion of the monopole of the corresponding cellular antenna.

FIG. 9 is a perspective view of a portion of the antenna assembly 100 showing the cellular antenna 200 in accordance with an exemplary embodiment. In an exemplary embodiment, the cellular antenna 200 includes multiple slots 380 defining multiple integrated Wi-Fi antennas 220 integrated into the cellular antenna 200. A first slot **380*a* is open at the inner edge of the extension segment 344 and a second slot 380*b* is open at a side edge of the extension segment 344. The first slot 380 is L-shaped extending along perpendicular segments. The second slot 380*b*** is L-shaped extending along perpendicular segments. Other shapes are possible in alternative embodiments.

Figure 10:
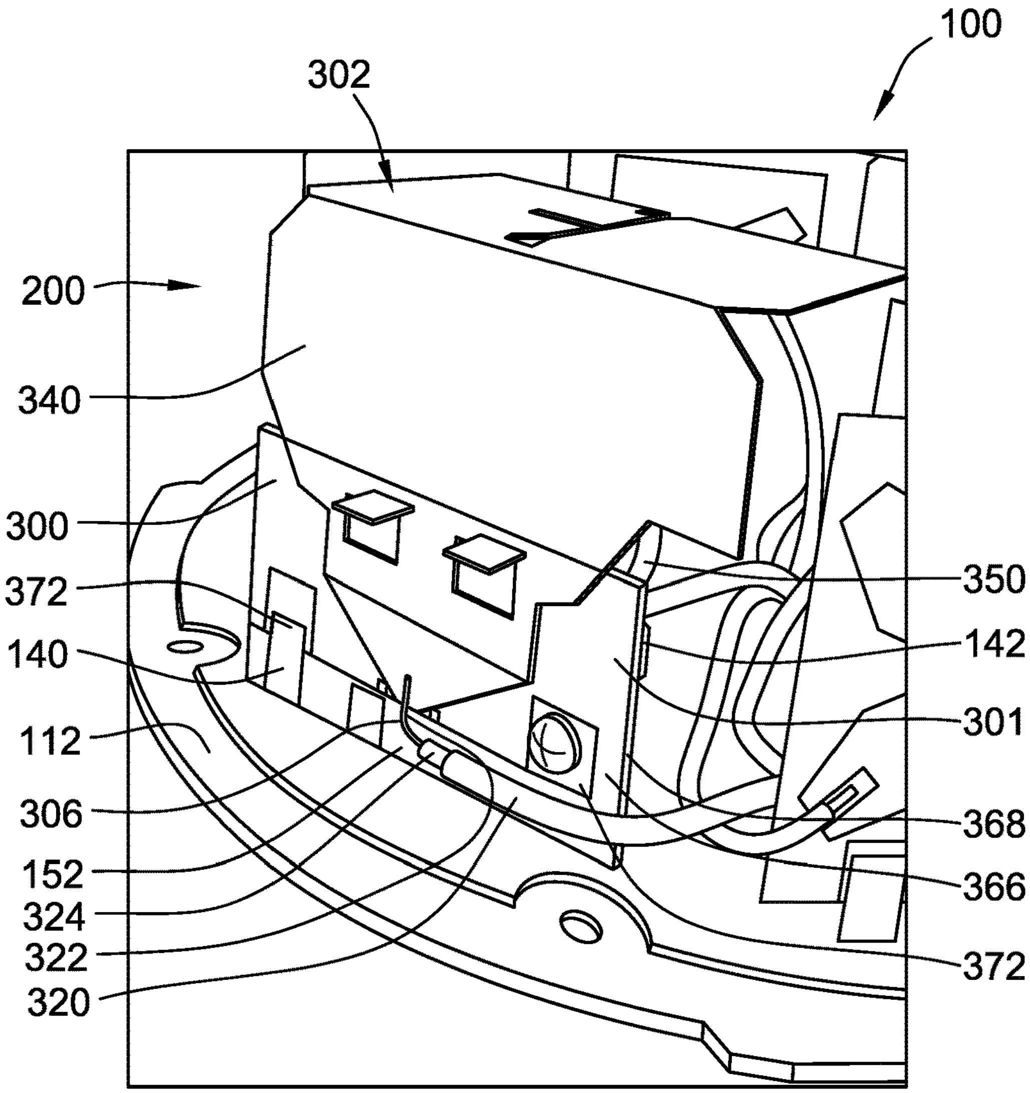
FIG. 10 is a perspective view of a portion of the antenna assembly showing the cellular antenna in accordance with an exemplary embodiment.
Figure 11:
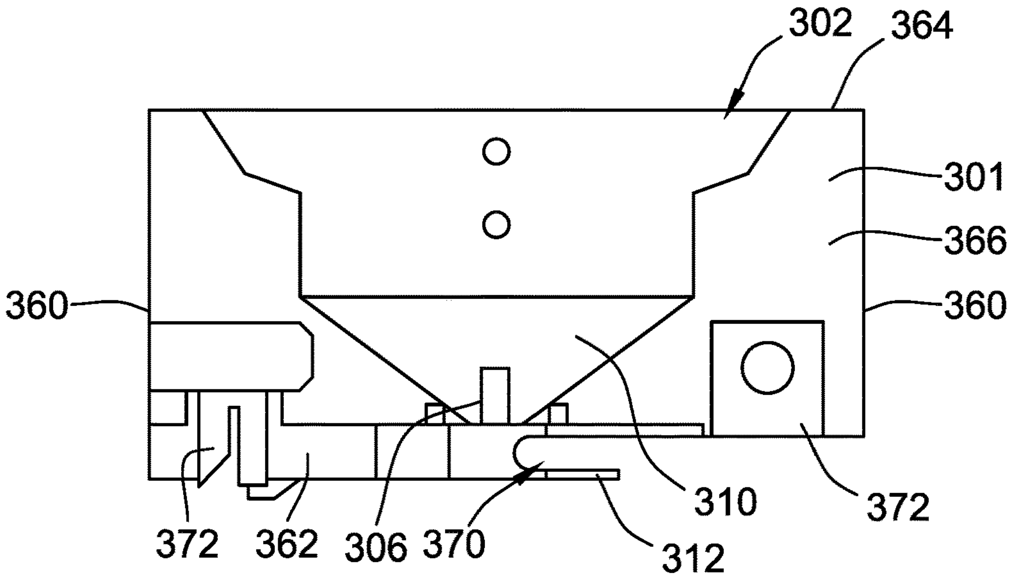
FIG. 11 is a side view of a portion of the cellular antenna showing the circuit board in accordance with an exemplary embodiment.

FIG. 10 is a perspective view of a portion of the antenna assembly 100 showing the cellular antenna 200 in accordance with an exemplary embodiment. FIG. 11 is a side view of a portion of the cellular antenna 200 showing the circuit board 301 in accordance with an exemplary embodiment. The cellular antenna 200 includes the dielectric support 300 and the antenna element 302 coupled to the dielectric support 300.

The circuit board 301 includes a dielectric substrate having sides 360 extending between a bottom 362 and a top 364. The circuit board 301 has a first surface 366 and a second surface 368. The feed circuit 310 and the ground circuit 312 are provided on the first surface 366. The stamped and formed radiating element 340 (FIG. 10) is connected to the feed circuit 310, such as being welded, soldered, riveted, or otherwise electrically connected to the feed circuit 310.

In an exemplary embodiment, the circuit board 301 includes a slot 370 at the feed portion 306 that receives the feed cable 320 (FIG. 10). The feed circuit 310 and the ground circuit 312 are defined by traces, vias or other circuits adjacent the slot 370 of the circuit board 301 to electrically connect to the feed cable 320. The center conductor 322 is connected to the feed circuit 310 and the cable shield 324 is connected to the ground circuit 312. The slot 370 receives the feed cable 320 to recess the feed cable 320 into the circuit board 301 to align the center conductor 322 with the first surface 366 of the circuit board 301 for improved performance.

In an exemplary embodiment, the circuit board 301 includes mounting studs 372 for mounting the circuit board 301 to the antenna base 112. The antenna base 112 includes mounting brackets 140 for supporting the circuit board 301. The mounting studs 372 may be mounted to the mounting brackets 140. For example, the mounting studs 372 may be soldered or welded to the mounting brackets 140. The mounting studs 372 may be connected to the mounting brackets 140 using fasteners. In an exemplary embodiment, antenna base 112 includes mounting brackets 142 for the shorting legs 350. The mounting brackets 142 are connected to the ground plane 152 to electrically connect the shorting legs 350 to the ground plane 152.

Figure 12:
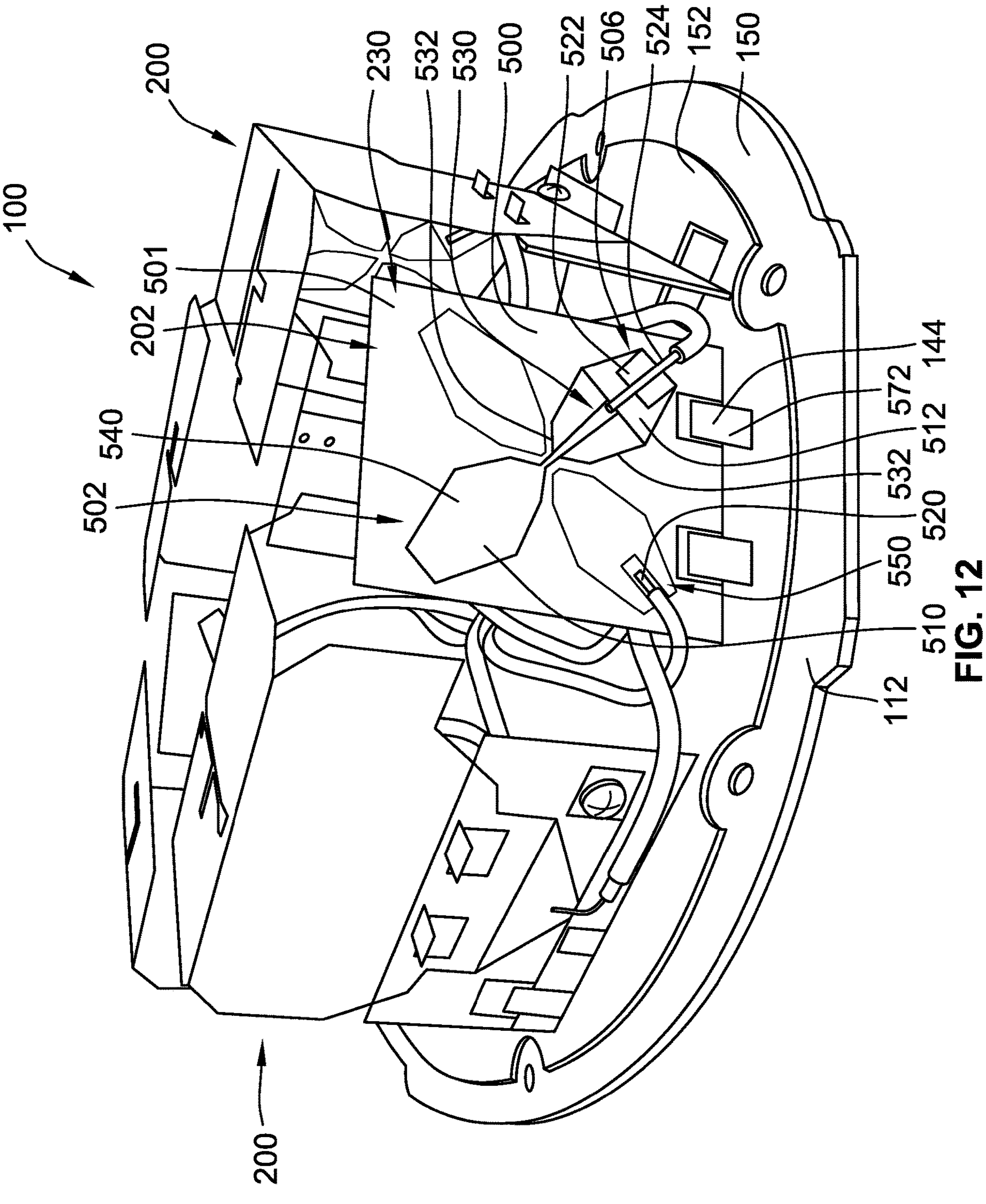
FIG. 12 is a perspective view of a portion of the antenna assembly showing the cellular antennas and the Wi-Fi antennas in accordance with an exemplary embodiment.
Figure 13:
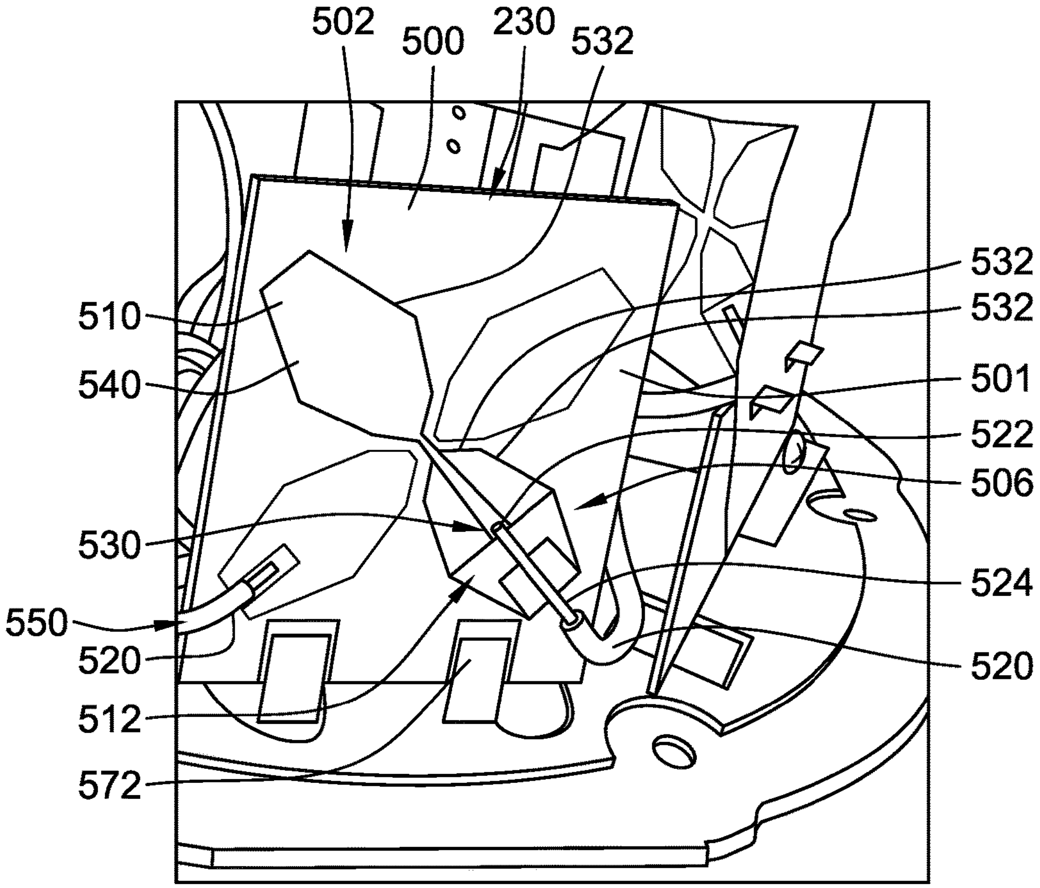
FIG. 13 is a perspective view of a portion of the antenna assembly showing one of the Wi-Fi antennas in accordance with an exemplary embodiment.

FIG. 12 is a perspective view of a portion of the antenna assembly 100 showing the cellular antennas 200 and the Wi-Fi antennas 202 in accordance with an exemplary embodiment. FIG. 13 is a perspective view of a portion of the antenna assembly 100 showing one of the Wi-Fi antennas 202. The Wi-Fi antenna 202 is a standalone Wi-Fi antenna 230 separate and discrete from the cellular antennas 200. The standalone Wi-Fi antenna 230 is mounted to the antenna base 112 separate from the cellular antennas 200.

The Wi-Fi antenna 230 includes a dielectric support 500 and one or more antenna elements 502 coupled to the dielectric support 500. In an exemplary embodiment, the dielectric support 500 includes a circuit board 501 and the antenna element 502 is defined by one or more circuits formed on the circuit board 501. However, in alternative embodiments, the antenna element 502 may be a stamped and formed part and the dielectric support 500 may be a formed dielectric part or a molded part that is devoid of circuits or conductors but rather is only used for mechanical support of the antenna element 502. In other various embodiments, the stamped and formed antenna element may be provided without the dielectric support altogether.

The dielectric support 500 supports the antenna elements 502 relative to the substrate 150. The dielectric support 500 provides a mounting interface to the circuit substrate 150. The dielectric support 500 may be coupled to mounting brackets 144, such as soldering, welding, using fasteners, and the like. In the illustrated embodiment, the dielectric support 500 is rectangular in shape with a bottom edge of the dielectric support 500 resting on the substrate 150. However, the dielectric support 500 may have other shapes in alternative embodiments. In various embodiments, the dielectric support 500 is oriented vertically, such as perpendicular to the substrate 150. In an exemplary embodiment, the antenna element 502 is isolated from the ground plane 152, such as by the dielectric support 500. For example, the dielectric support 500 may hold the antenna element 502 at a suspended or elevated position relative to the substrate 150 and the ground plane 152.

In an exemplary embodiment, the Wi-Fi antenna 230 is a dipole antenna having two antenna elements 502. In the illustrated embodiment, the antenna elements 502 are formed as a cross dipole. The antenna elements 502 are arranged in an X-pattern. Other types of antenna elements 502 may be used in alternative embodiments. Greater or fewer antenna elements 502 may be provided in alternative embodiments. In an exemplary embodiment, the circuit board 501 includes a feed circuit 510 and a ground circuit 512. The circuit board 501 may include a shorting circuit connected to the ground circuit 512 and/or the ground plane 152. The circuit board 501 may include additional circuits in various embodiments. The circuits are traces, vias or other types of conductors of the circuit board 501.

In an exemplary embodiment, a feed cable 520 is electrically connected to the feed portion. For example, the feed cable 520 is electrically connected to the feed circuit 510 and the ground circuit 512. In an exemplary embodiment, a center conductor 522 of the feed cable 520 is connected to the feed circuit 510, such as being soldered to the feed circuit 510. A cable shield 524 of the feed cable 520 is connected to the ground circuit 512, such as being soldered to the ground circuit 512. The ground circuit 512 may be electrically connected to the ground plane 152 of the substrate 150. In the illustrated embodiment, the feed portion is located near the bottom edge of the circuit board 501. The feed portions may be oriented at +45° and −45° on opposite sides of the circuit board 501. Each feed circuit 510 may have a feed point 530. The center conductor 522 is connected to the feed circuit 510 at the feed point 530. In an exemplary embodiment, the circuit board 501 has a masking layer at the feed point 530 masking the center conductor 522 from the ground circuit 512. The feed circuit 510 includes steps 532 having slanted edges along portions of the steps 532. The slanted edges along the multiple steps 532 may offer flexibility for optimization for wide bandwidth. Each antenna element 502 has a radiating element 540. The edges of the radiating element 540 may be angled relative to each other at various angles to create steps to create both height and width for the radiating element. The size and shape of the radiating element 540 may control the characteristics of the radiating element, such as to control operation at a target frequency range.

In an exemplary embodiment, the circuit board 501 includes slots 550 at the feed portion 506 that receives the feed cable 520. The feed circuit 510 and the ground circuit 512 are defined by traces, vias or other circuits adjacent the slot 550 of the circuit board 501 to electrically connect to the feed cable 520. The slot 550 receives the feed cable 520 to recess the feed cable 520 into the circuit board 501 to align the center conductor 522 with the surface of the circuit board 501 for improved performance.

In an exemplary embodiment, the circuit board 501 includes mounting studs 572 for mounting the circuit board 501 to the antenna base 112. The mounting studs 572 may be mounted to the mounting brackets 144 of the antenna base 112. For example, the mounting studs 572 may be soldered or welded to the mounting brackets 144. The mounting studs 572 may be connected to the mounting brackets 144 using fasteners.

Figure 14:
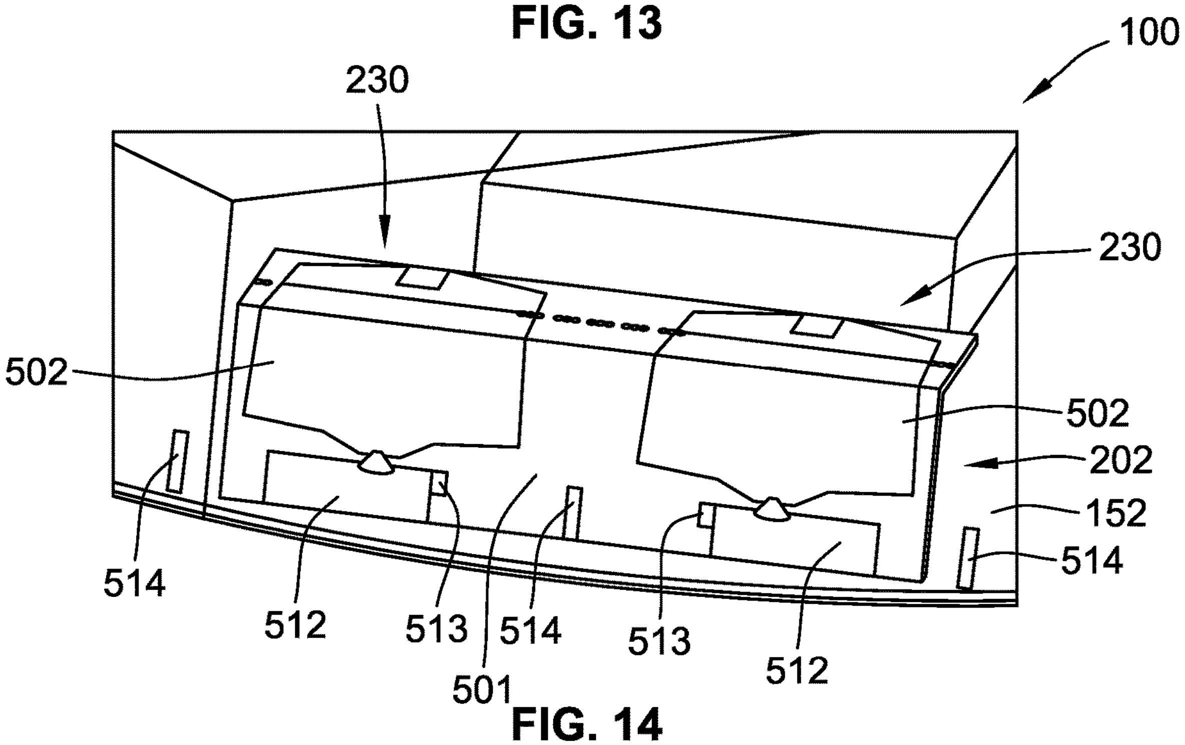
FIG. 14 is a perspective view of a portion of the antenna assembly showing one of the standalone Wi-Fi antennas in accordance with an exemplary embodiment.

FIG. 14 is a perspective view of a portion of the antenna assembly 100 showing one of the standalone Wi-Fi antennas 202 in accordance with an exemplary embodiment. The Wi-Fi antenna 230 includes a pair of the antenna elements 502 on the dielectric support 500. The antenna elements 502 are vertical monopole antenna elements. The antenna elements 502 may be circuits of the circuit board 501 or may be stamped and formed structures. In the illustrated embodiment, the antenna elements 502 are top loaded including an L-shaped upper portion to increase the length of the antenna element 502 while maintaining a low profile to fit within the radome 114. The shape of the antenna element 502 may provide an omni-directional antenna. In an exemplary embodiment, the upper portions of the antenna elements 502 have slots or openings to define patch antennas.

In an exemplary embodiment, the ground circuit 512 is a vertical ground circuit at the bottom of the circuit board 501. Optionally, the ground circuit 512 may be asymmetrical including stubs 513 for antenna matching. In an exemplary embodiment, isolation studs 514 may be provided between the antenna elements 502 and/or between the antenna elements 502 and the cellular antennas 200 to reduce mutual coupling. The isolation studs 514 may be electrically connected to the ground plane 152 to improve the isolation level.

Figure 15:
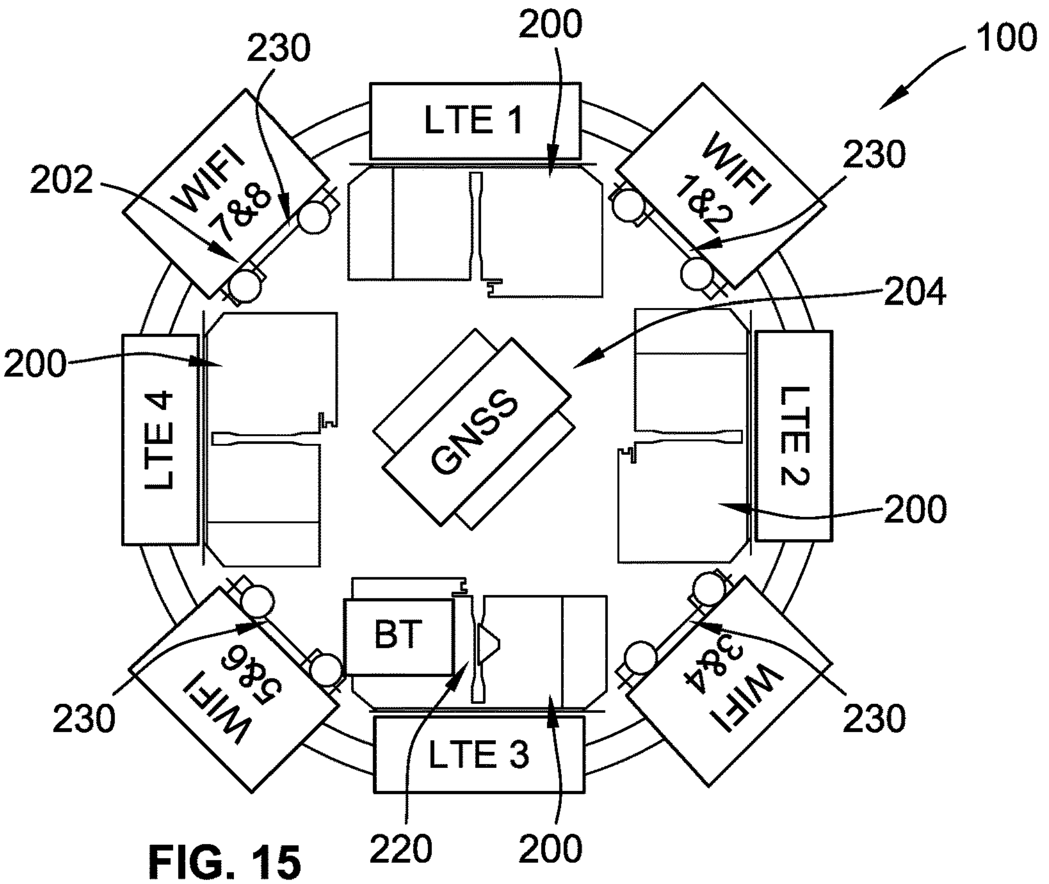
FIG. 15 is a top view of a portion of the antenna assembly illustrating components of the antenna assembly in a first antenna arrangement in accordance with an exemplary embodiment.

FIG. 15 is a top view of a portion of the antenna assembly 100 illustrating components of the antenna assembly 100 in a first antenna arrangement. In the illustrated embodiment, the antenna assembly 100 includes fourteen ports (for example, fourteen radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200 and four of the standalone Wi-Fi antennas 230. The standalone Wi-Fi antennas 230 are dipole antennas having two radiating elements each. One of the cellular antennas 200 includes an integrated Wi-Fi open slot antenna 220, which is operated as a Bluetooth antenna. The antenna assembly 100 includes the GNSS/GPS satellite antenna 204.

Figure 16:
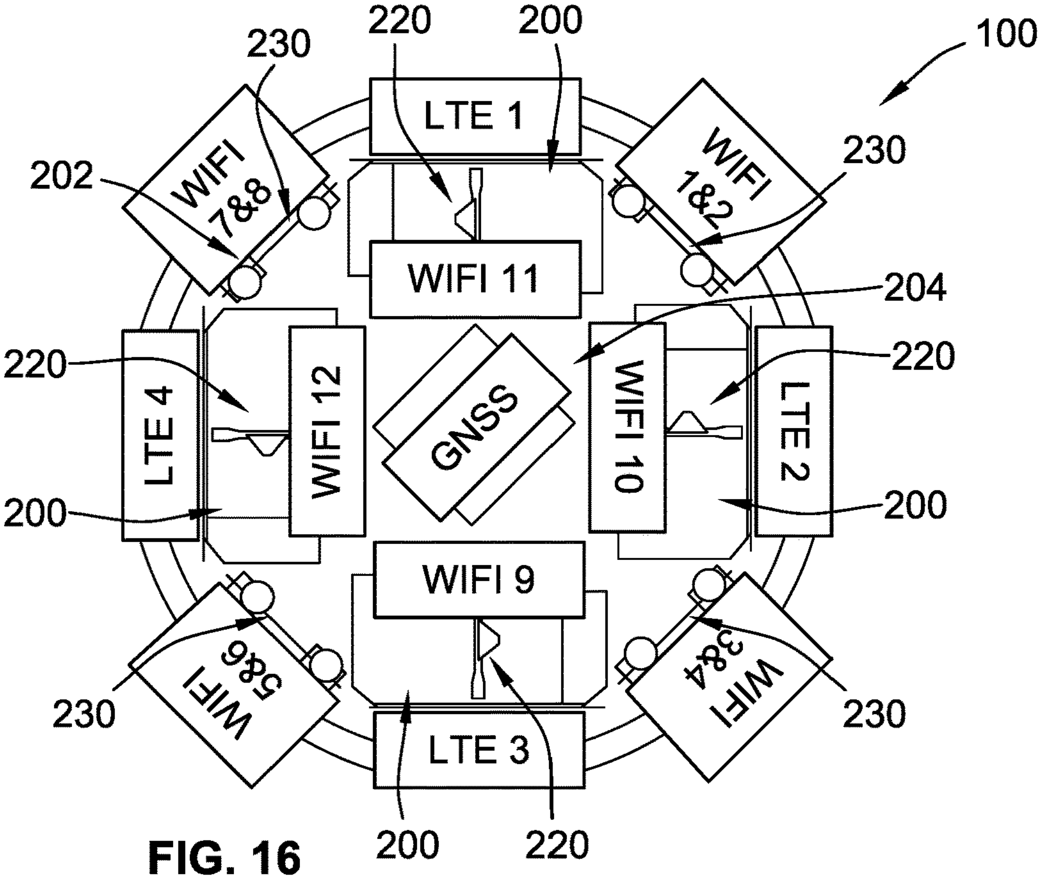
FIG. 16 is a top view of a portion of the antenna assembly illustrating components of the antenna assembly in a first antenna arrangement in accordance with an exemplary embodiment.

FIG. 16 is a top view of a portion of the antenna assembly 100 illustrating components of the antenna assembly 100 in a first antenna arrangement. In the illustrated embodiment, the antenna assembly 100 includes seventeen ports (for example, seventeen radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200 and four of the standalone Wi-Fi antennas 230. The standalone Wi-Fi antennas 230 are dipole antennas having two radiating elements each. All of the cellular antennas 200 includes an integrated Wi-Fi open slot antenna 220. The antenna assembly 100 includes the GNSS/GPS satellite antenna 204.

Figure 17:
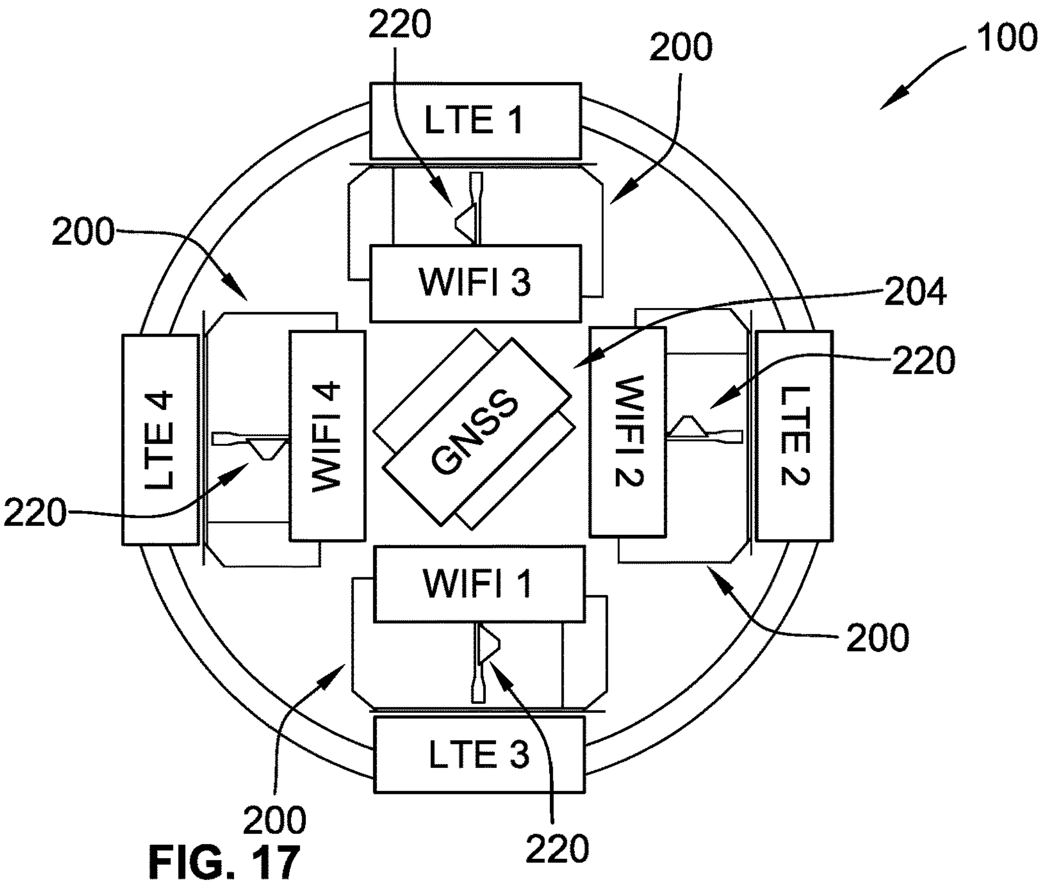
FIG. 17 is a top view of a portion of the antenna assembly illustrating components of the antenna assembly in a first antenna arrangement in accordance with an exemplary embodiment.

FIG. 17 is a top view of a portion of the antenna assembly 100 illustrating components of the antenna assembly 100 in a first antenna arrangement. In the illustrated embodiment, the antenna assembly 100 includes nine ports (for example, nine radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200, each including an integrated Wi-Fi antenna 220. The antenna assembly 100 includes the GNSS/GPS satellite antenna 204.

Figure 18:
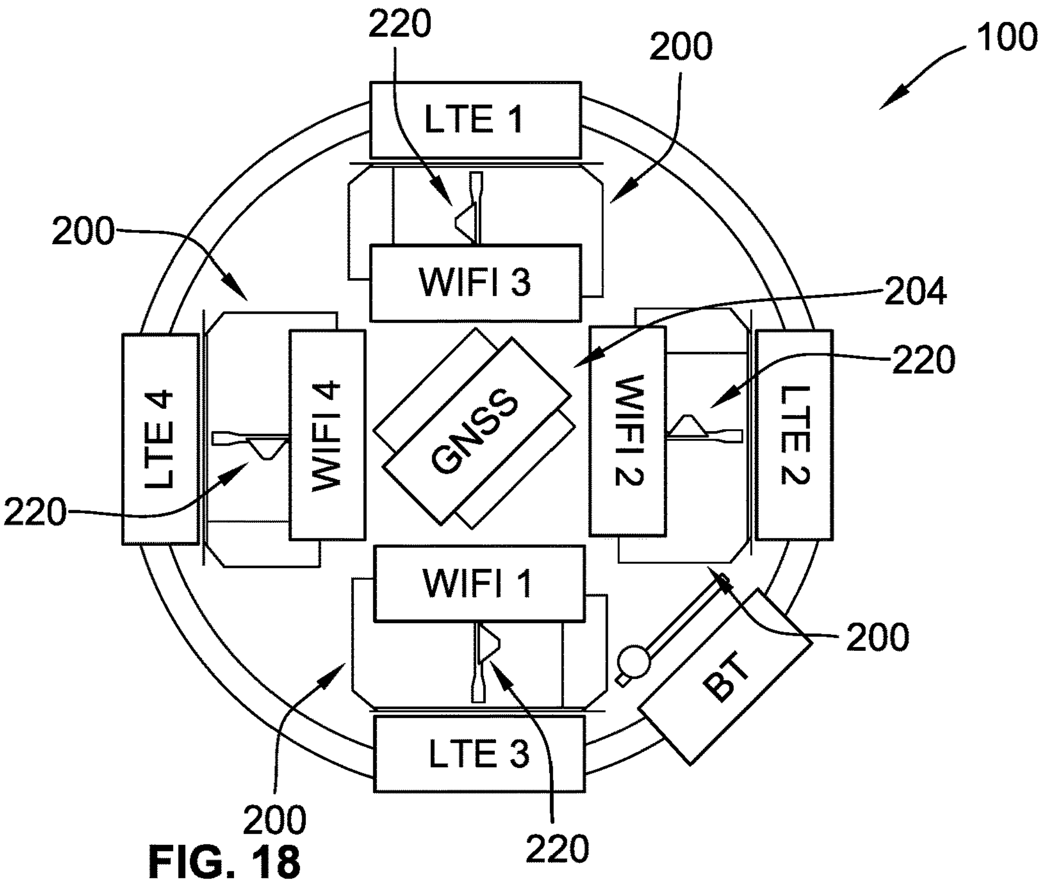
FIG. 18 is a top view of a portion of the antenna assembly illustrating components of the antenna assembly in a first antenna arrangement in accordance with an exemplary embodiment.

FIG. 18 is a top view of a portion of the antenna assembly 100 illustrating components of the antenna assembly 100 in a first antenna arrangement. In the illustrated embodiment, the antenna assembly 100 includes ten ports (for example, ten radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200, each including an integrated Wi-Fi open slot antenna 220, and one standalone Wi-Fi antenna 230 having a single dipole or monopole radiating element, which may be a Bluetooth antenna. The antenna assembly 100 includes the GNSS/GPS satellite antenna 204.

Figure 19:
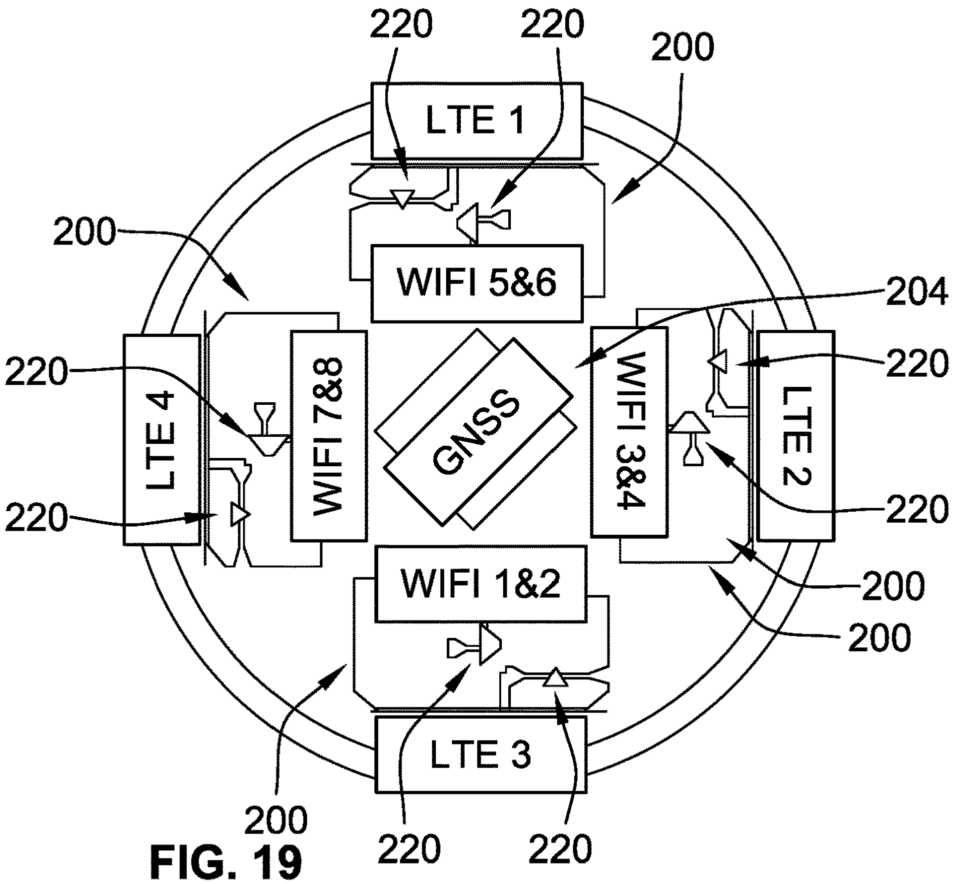
FIG. 19 is a top view of a portion of the antenna assembly illustrating components of the antenna assembly in a first antenna arrangement in accordance with an exemplary embodiment.

FIG. 19 is a top view of a portion of the antenna assembly 100 illustrating components of the antenna assembly 100 in a first antenna arrangement. In the illustrated embodiment, the antenna assembly 100 includes thirteen ports (for example, thirteen radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200, each including two of the integrated Wi-Fi open slot antenna 220. The antenna assembly 100 includes the GNSS/GPS satellite antenna 204.

Figure 20:
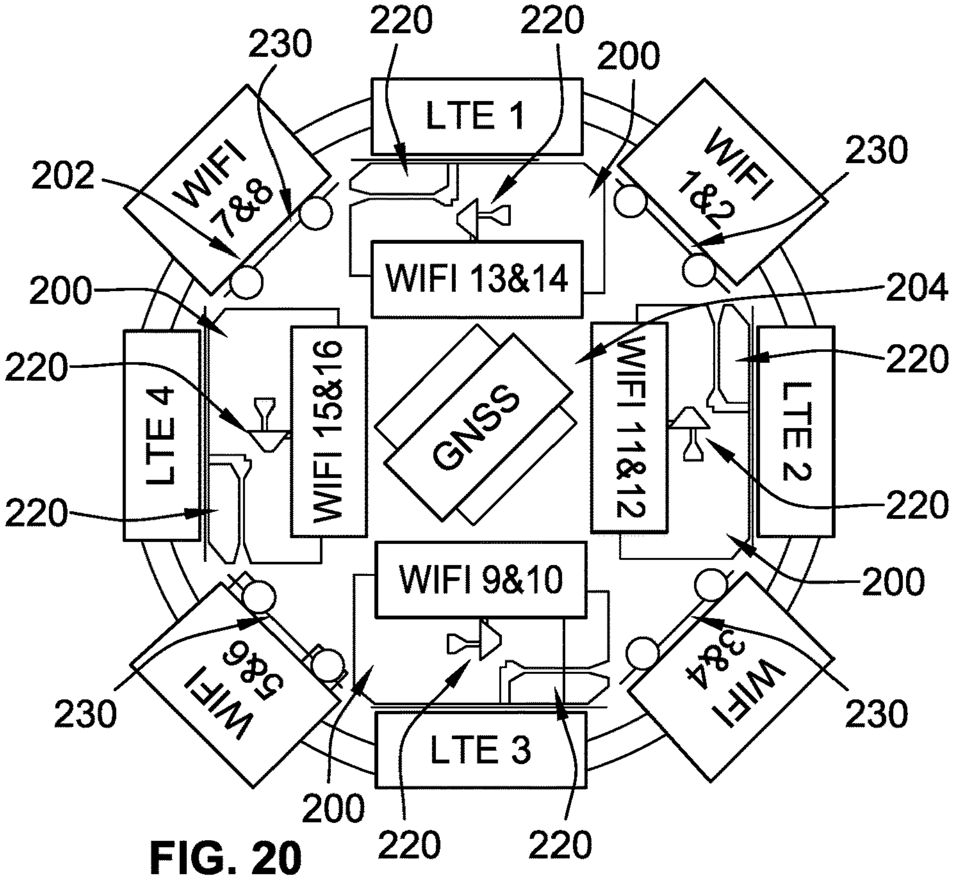
FIG. 20 is a top view of a portion of the antenna assembly illustrating components of the antenna assembly in a first antenna arrangement in accordance with an exemplary embodiment.
Figure 21A:
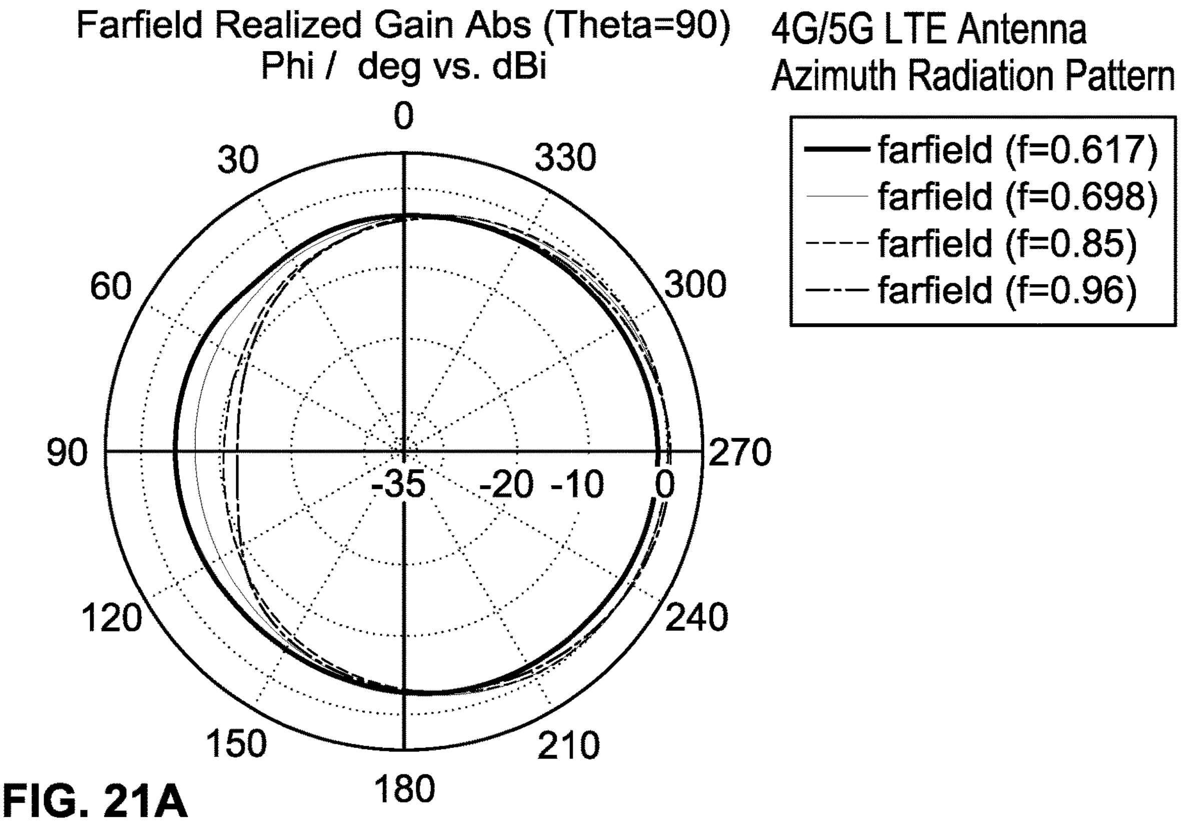
FIGS. 21A-D shows cellular antenna azimuth radiation patterns in accordance with an exemplary embodiment.
Figure 21B:
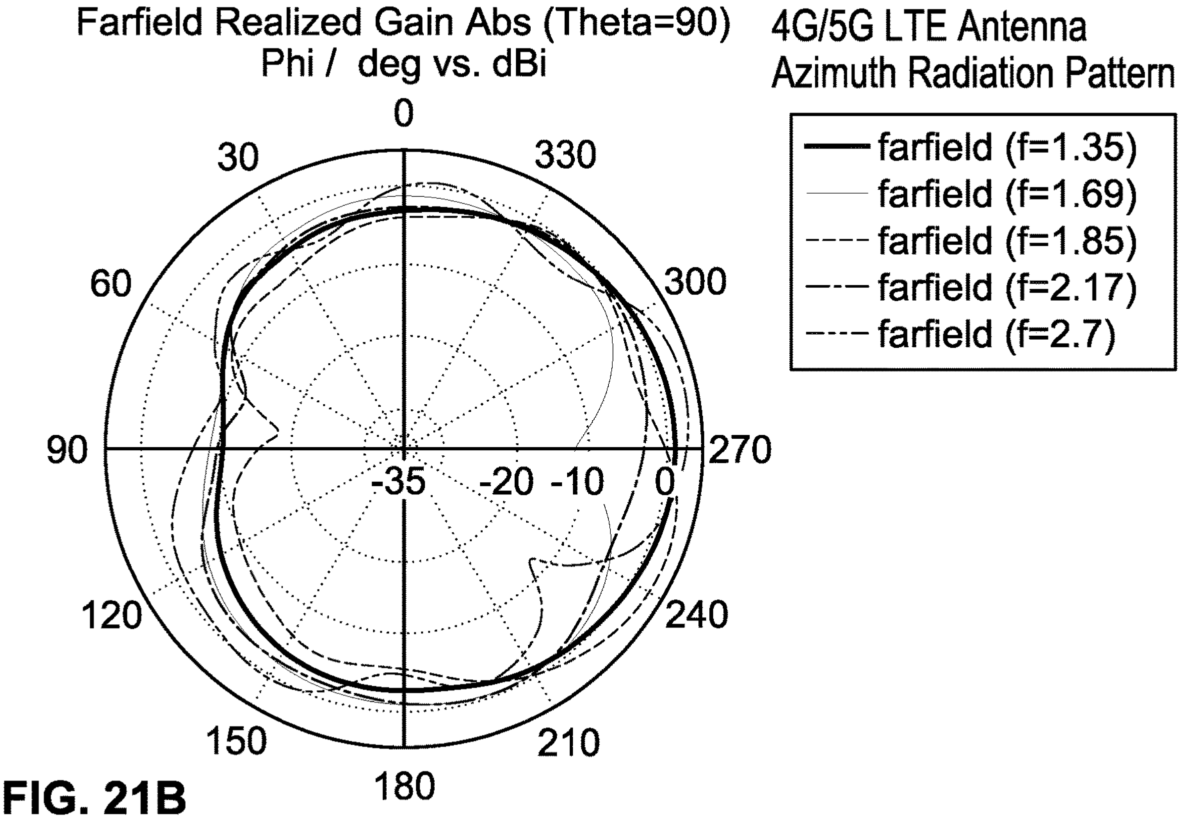
Figure 21C:
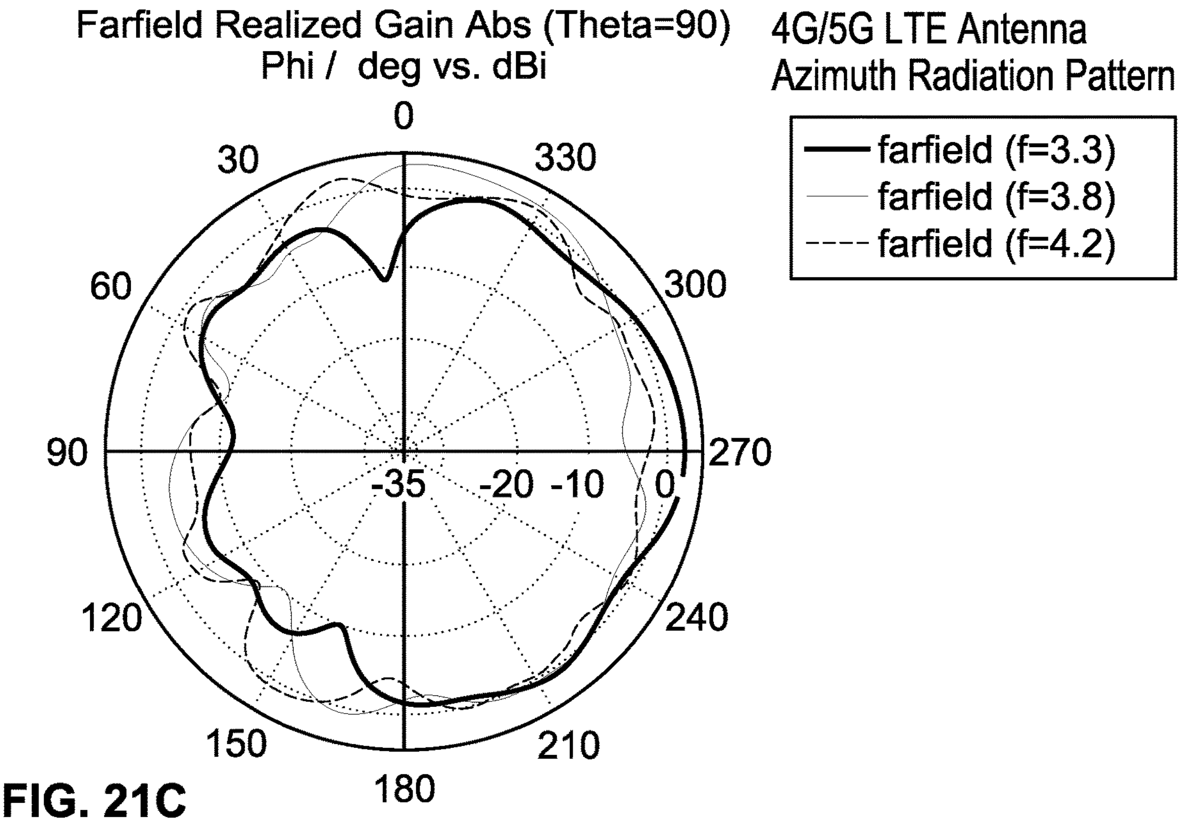
Figure 21D:
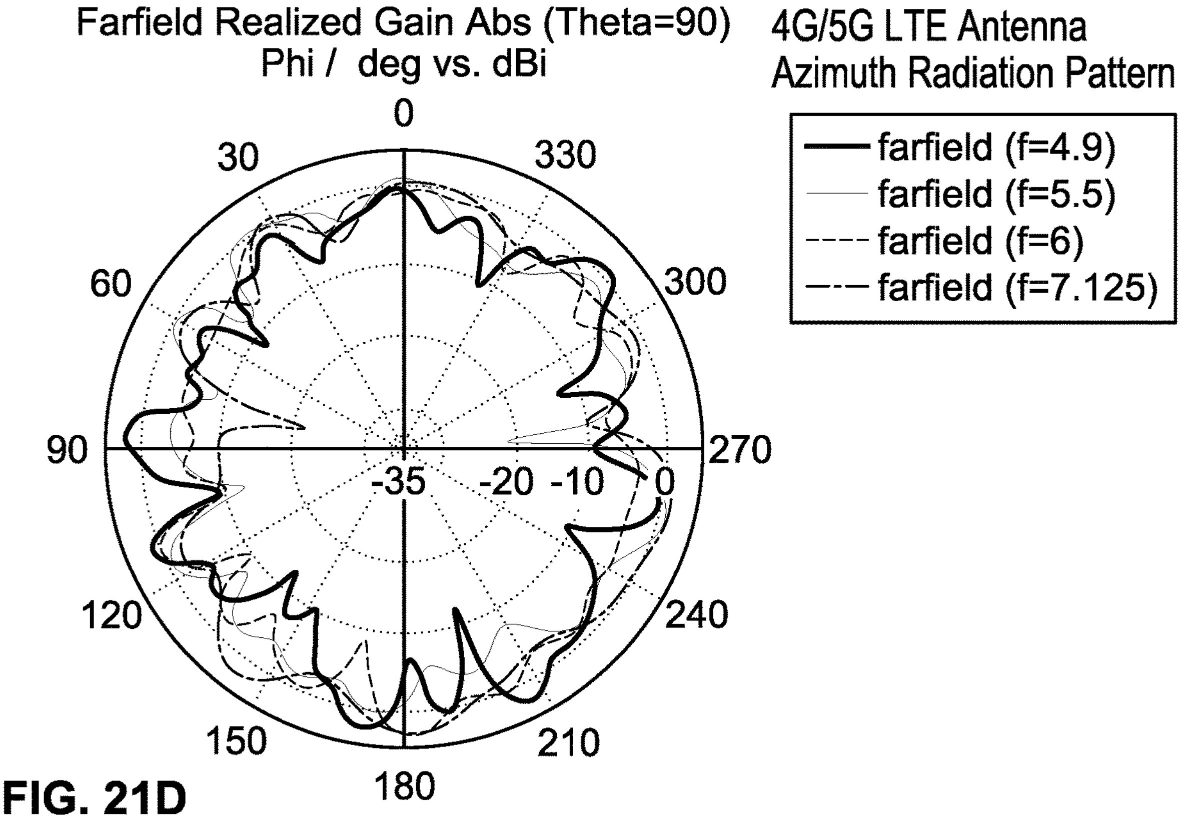
Figure 22A:
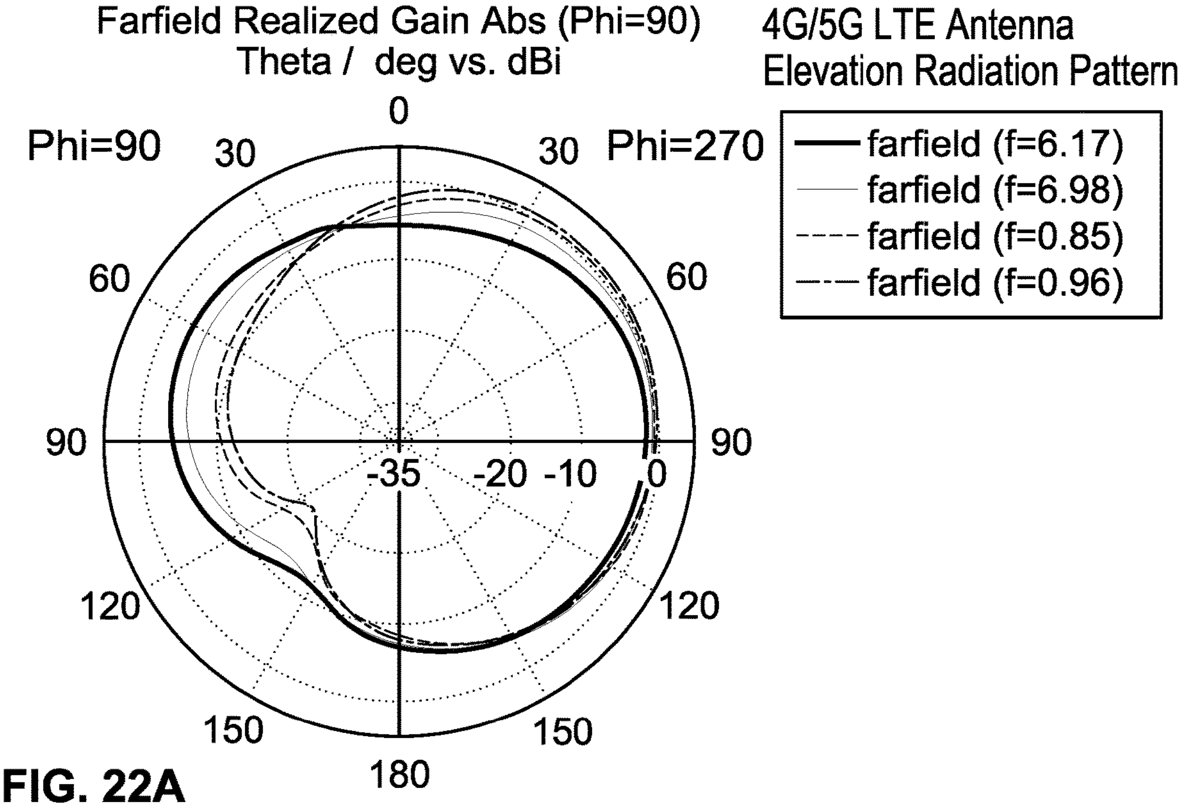
FIGS. 22A-D shows cellular antenna elevation radiation patterns in accordance with an exemplary embodiment.
Figure 22B:
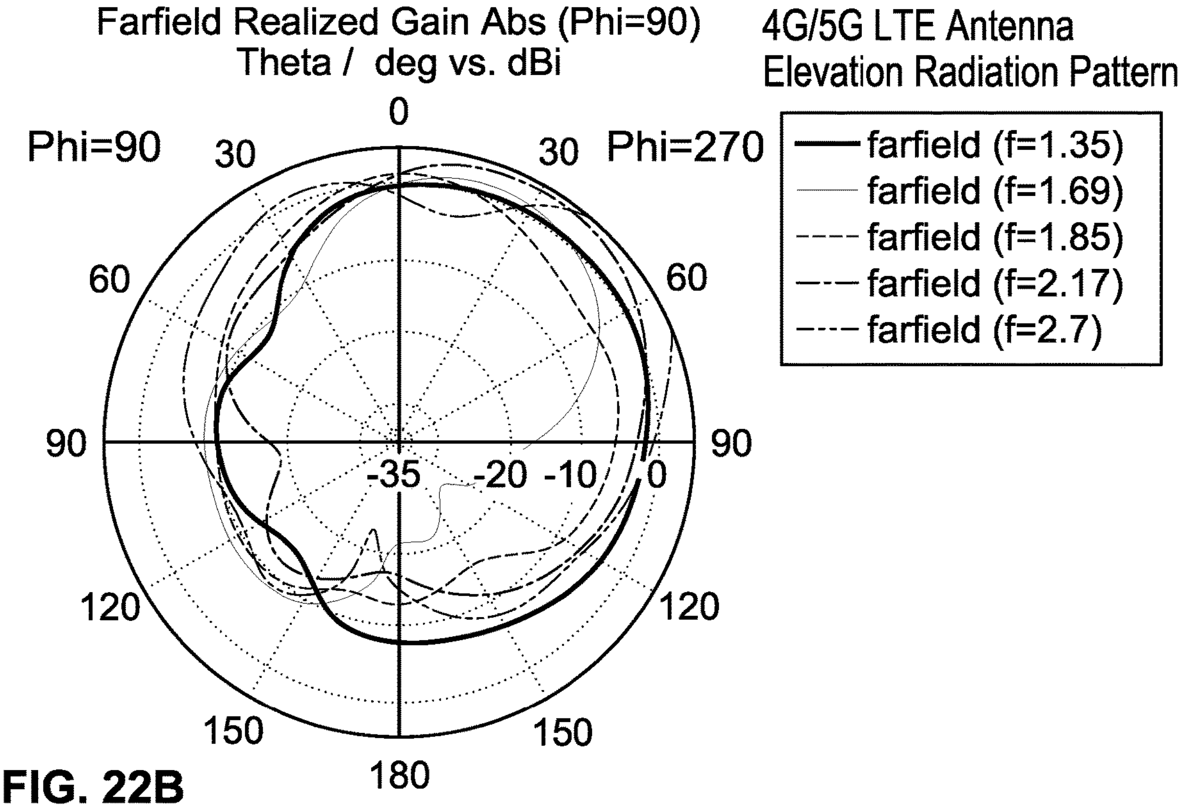
Figure 22C:
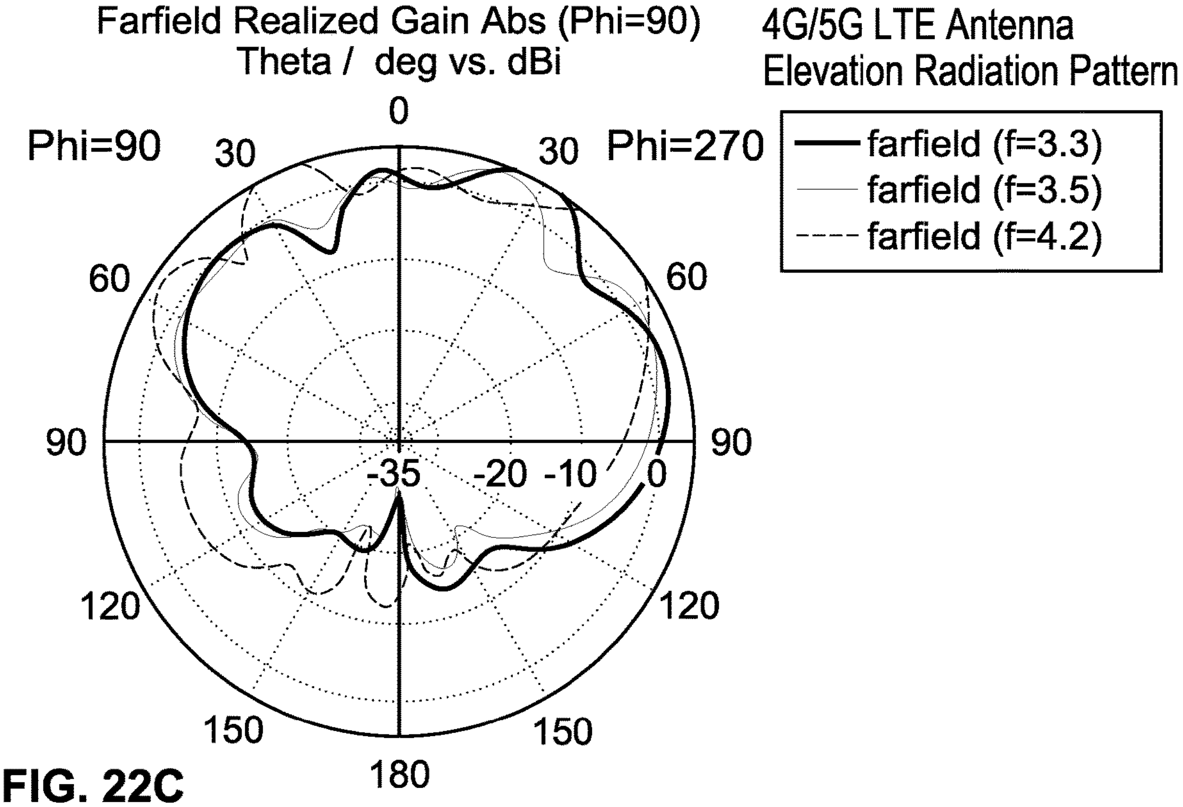
Figure 22D:
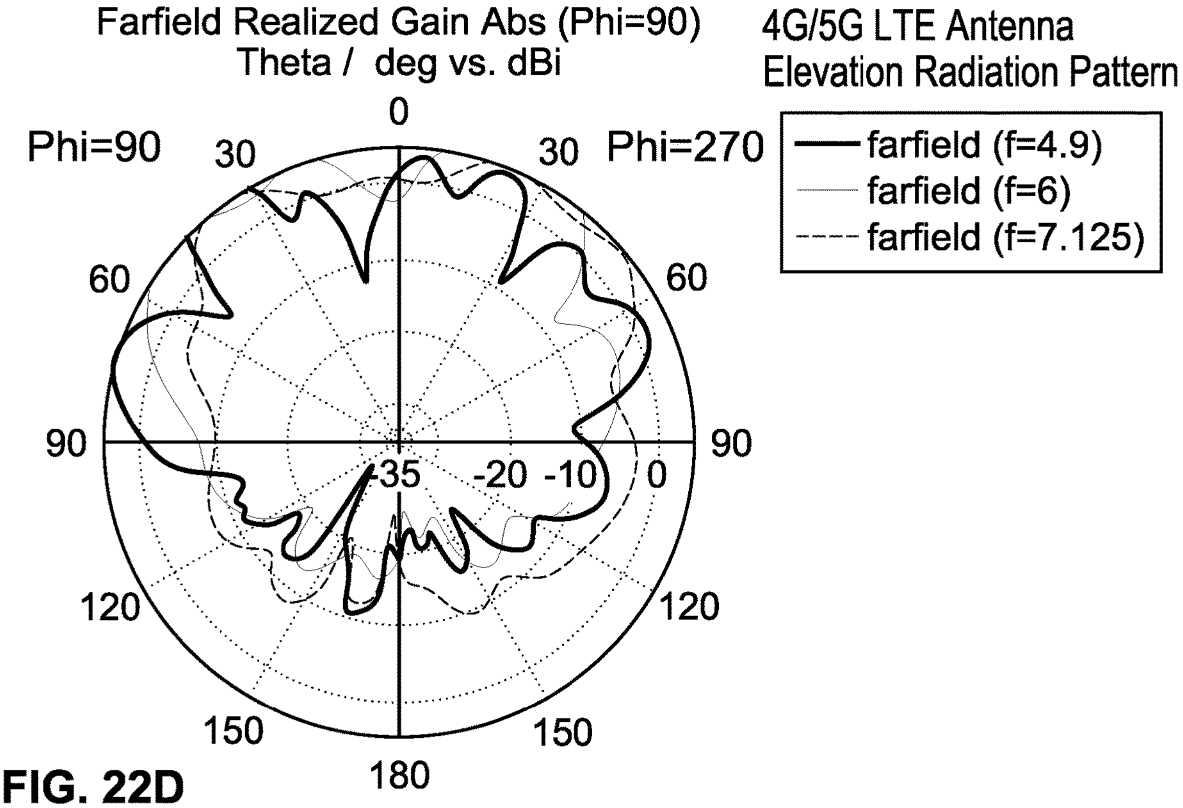
Figure 23A:
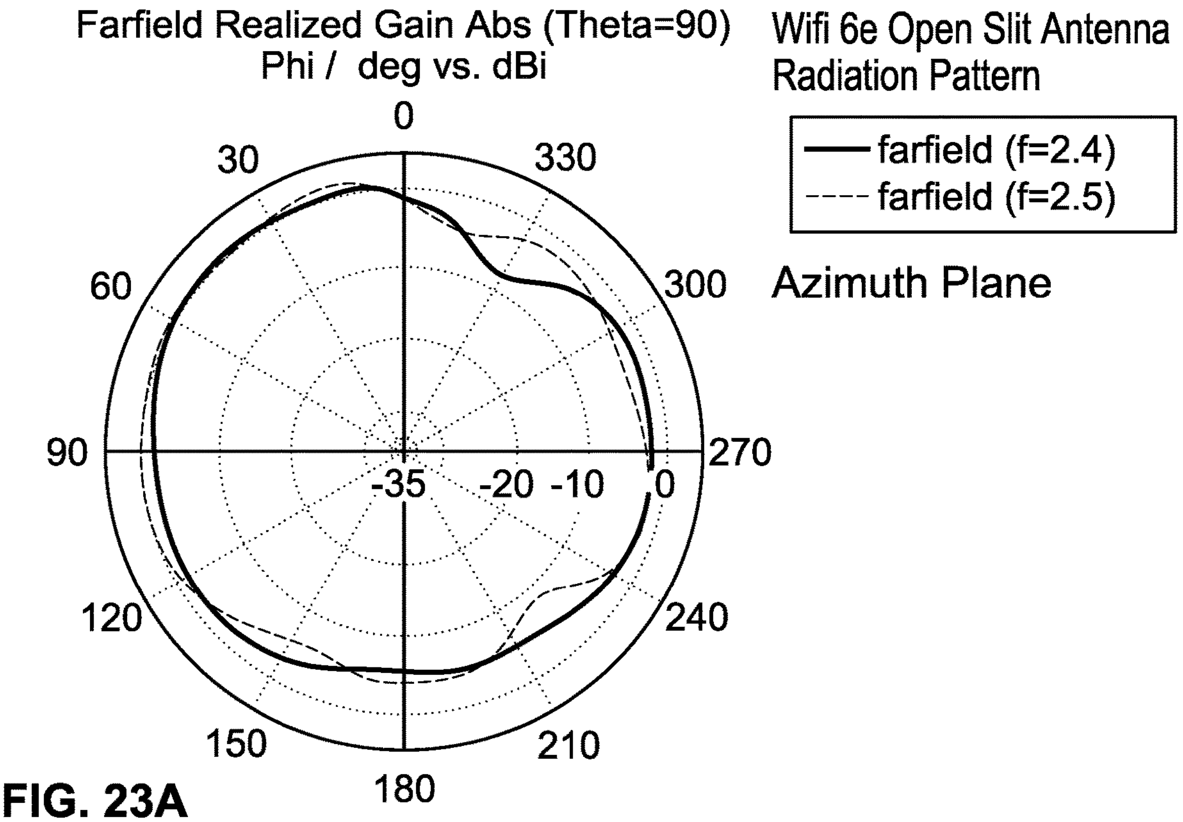
FIGS. 23A-D shows integrated Wi-Fi antenna radiation patterns in accordance with an exemplary embodiment.
Figure 23B:
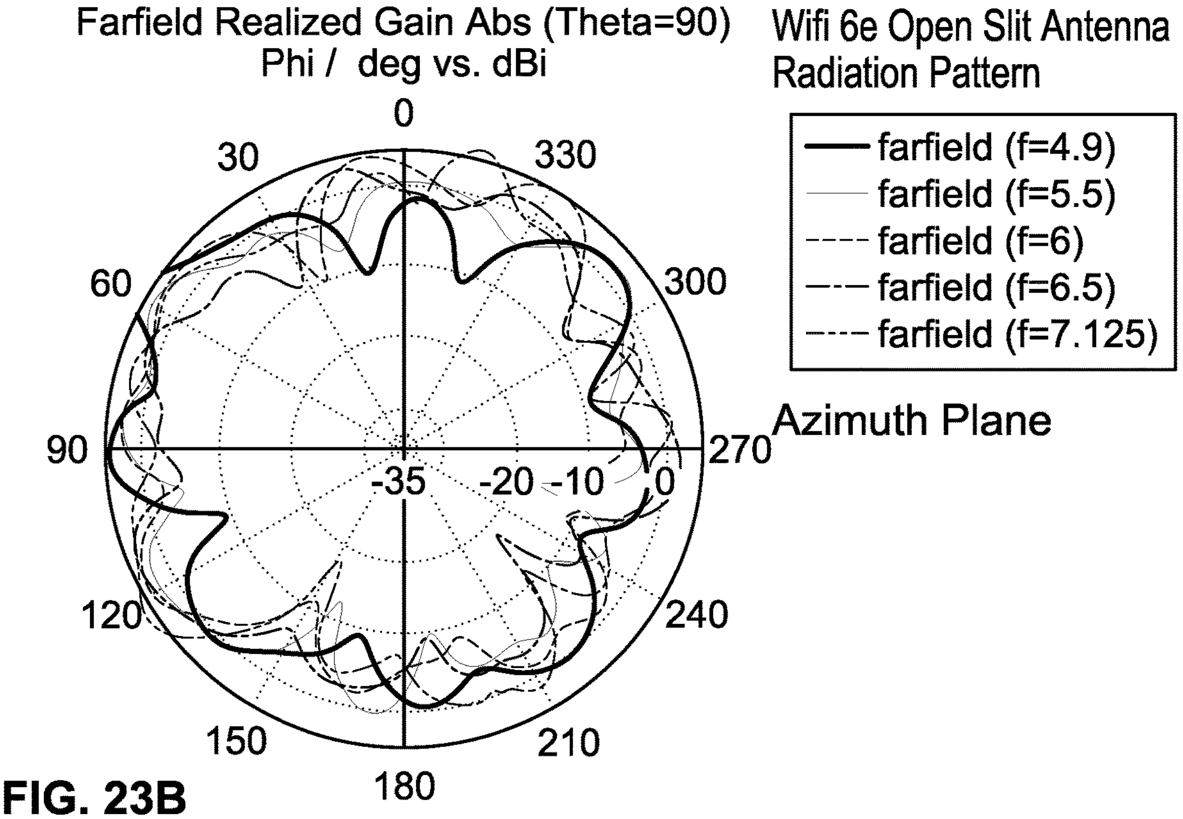
Figure 23C:
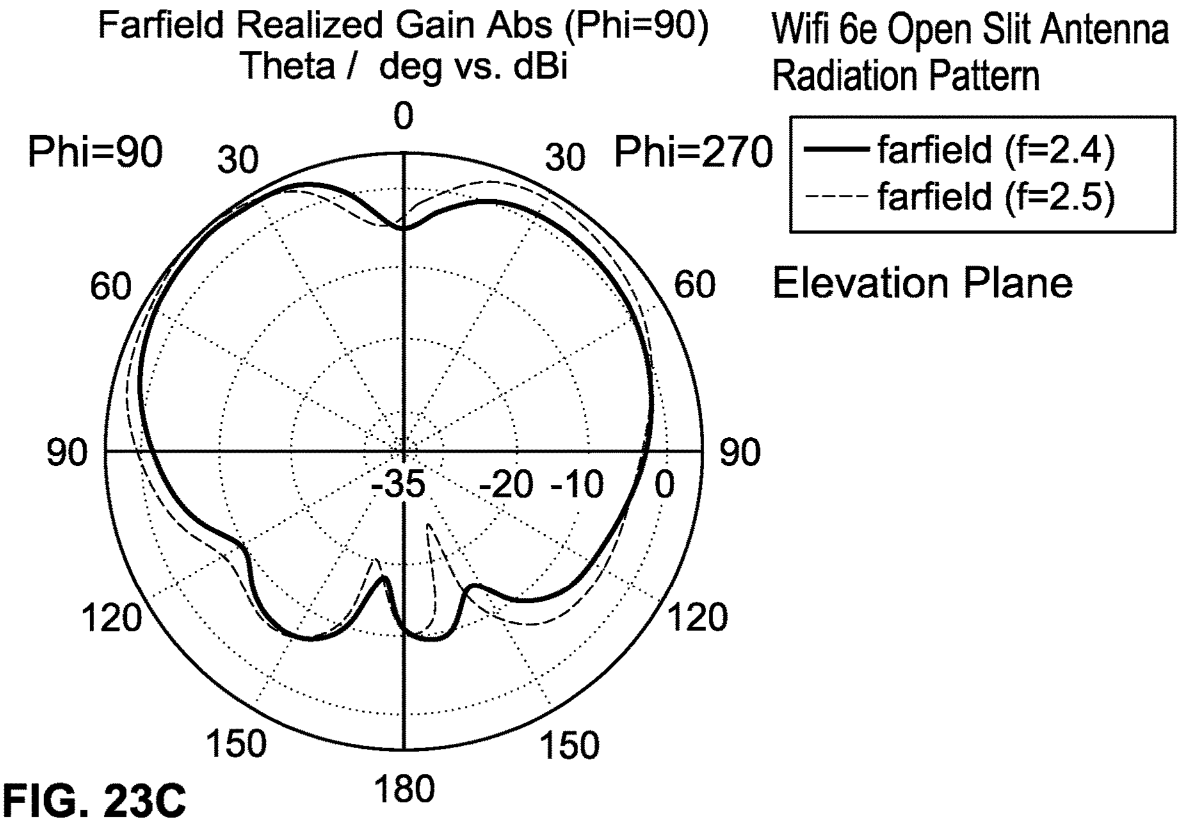
Figure 23D:
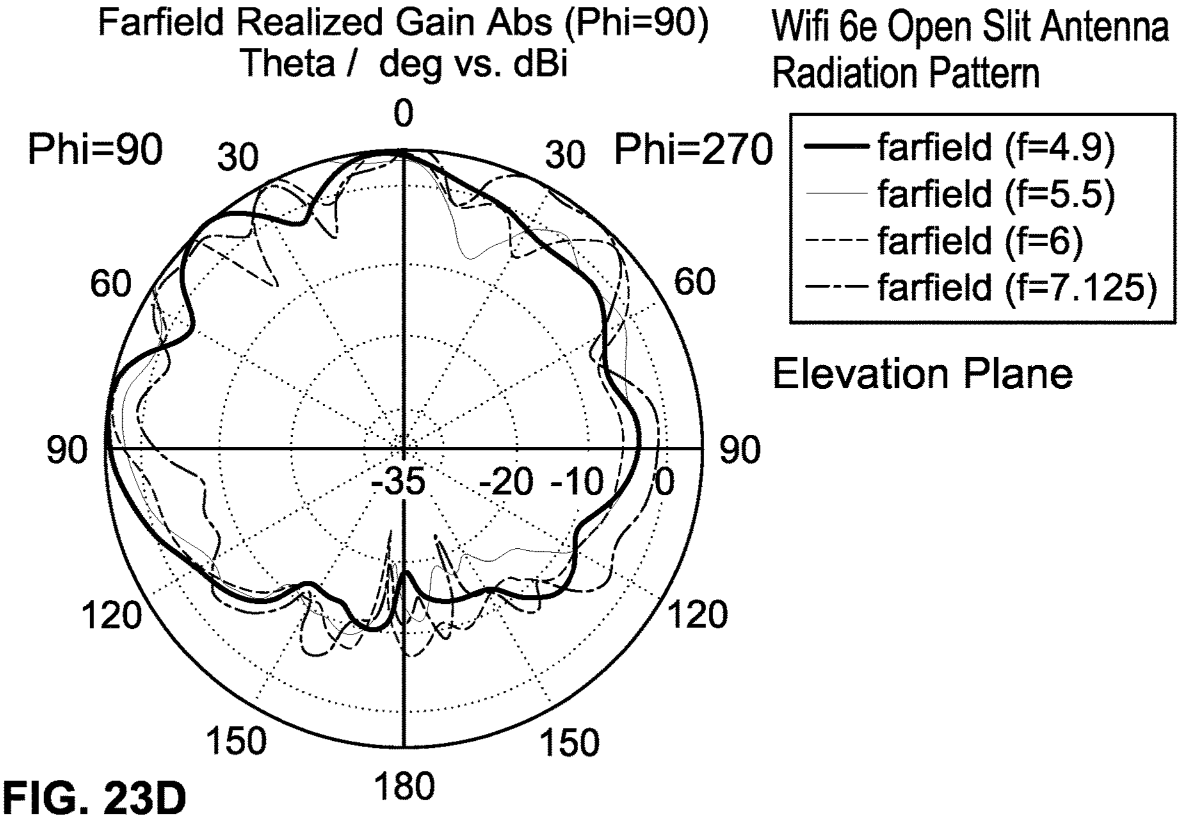
Figure 24A:
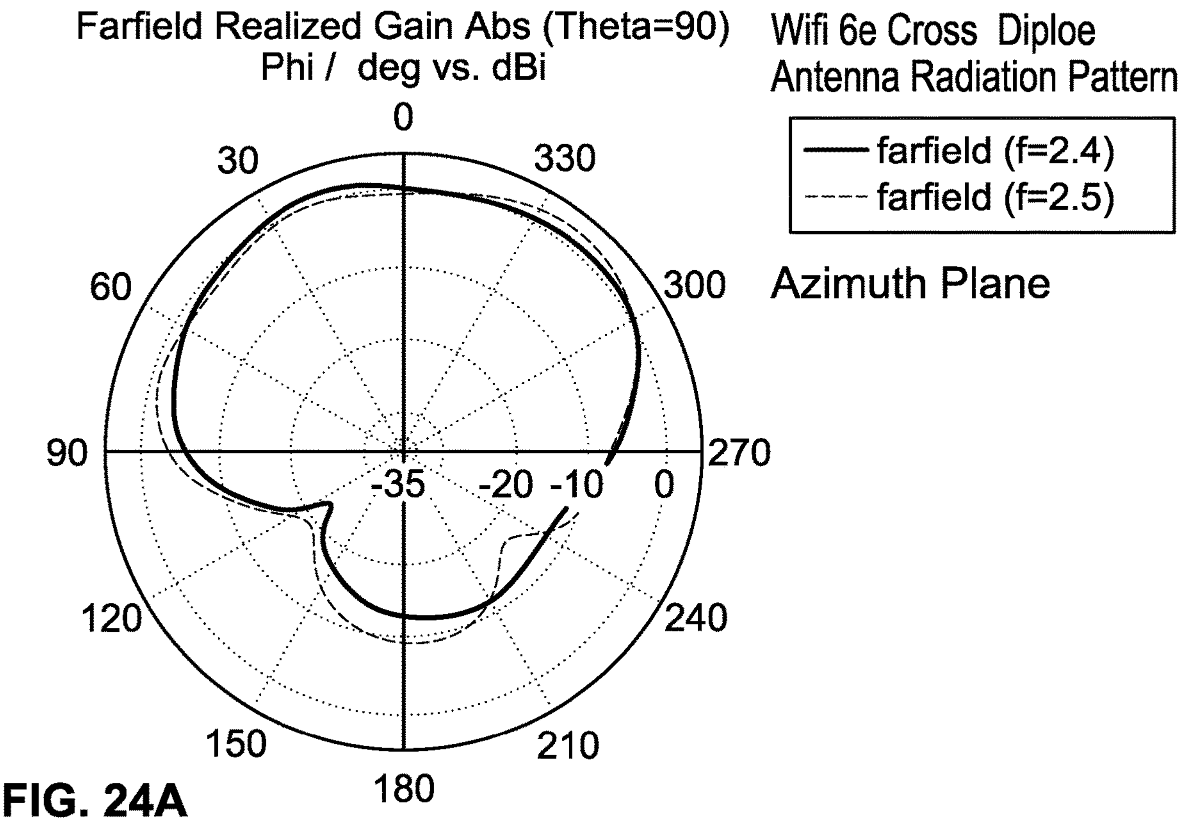
FIGS. 24A-D shows standalone Wi-Fi antenna radiation patterns of a cross dipole antenna in accordance with an exemplary embodiment.
Figure 24B:
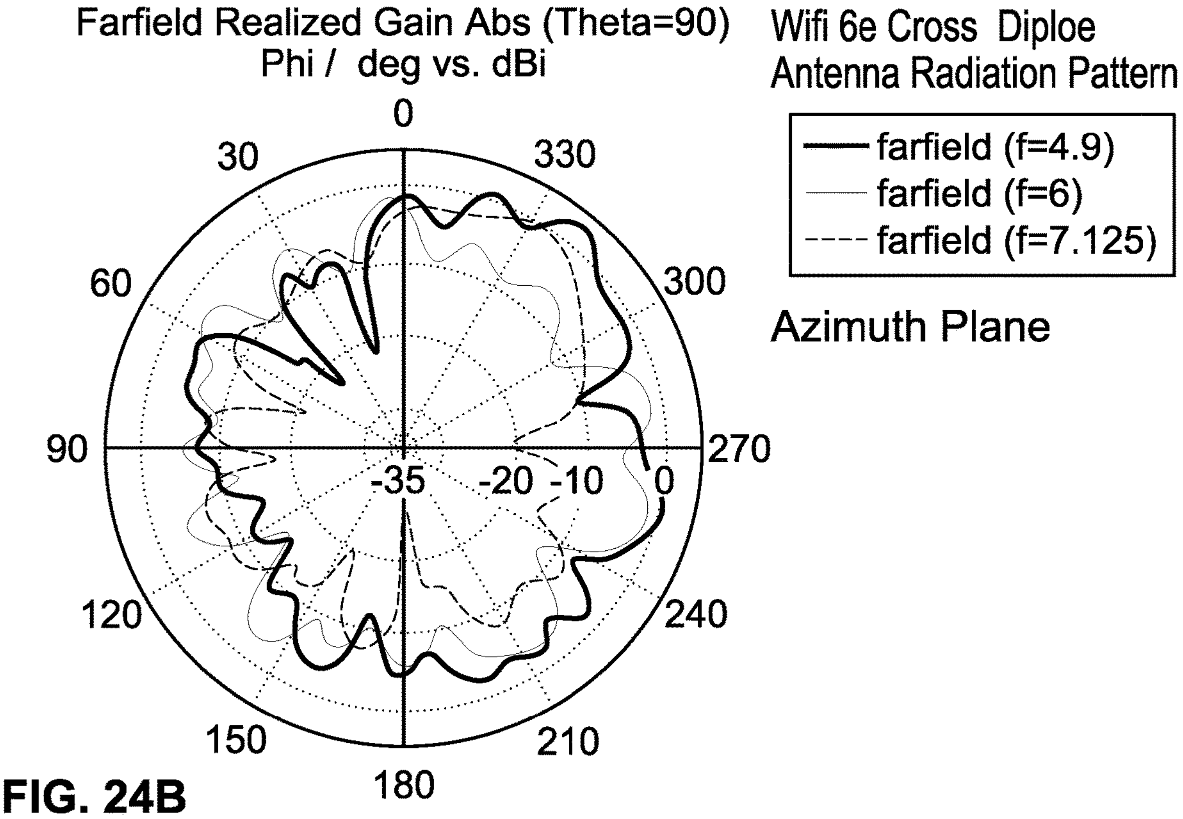
Figure 24C:
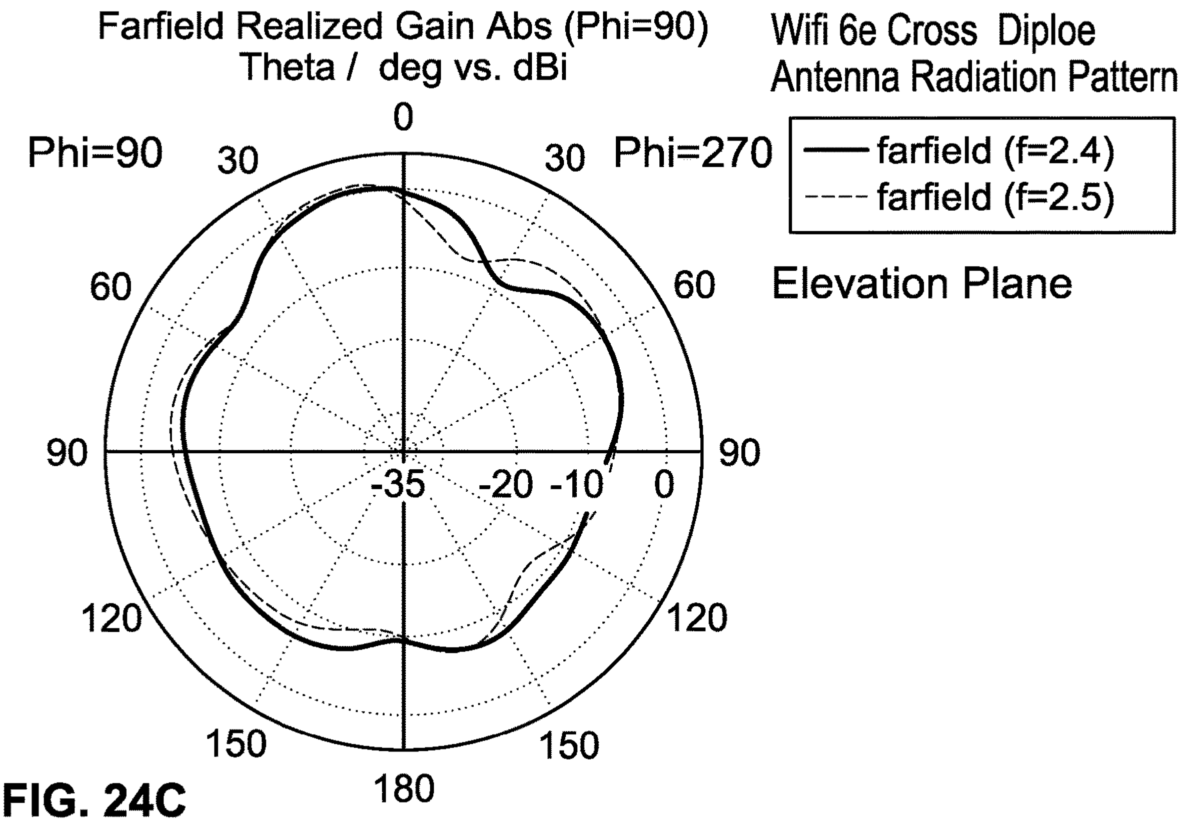
Figure 24D:
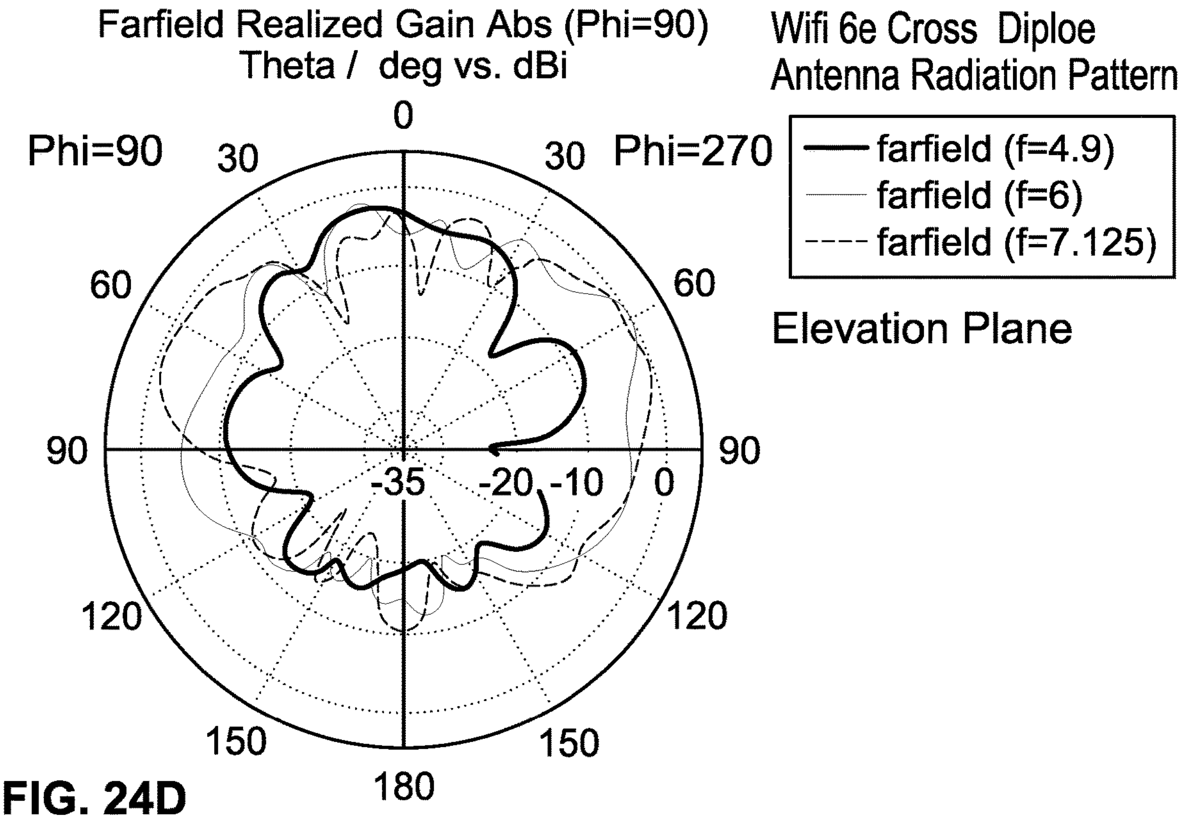
Figure 25A:
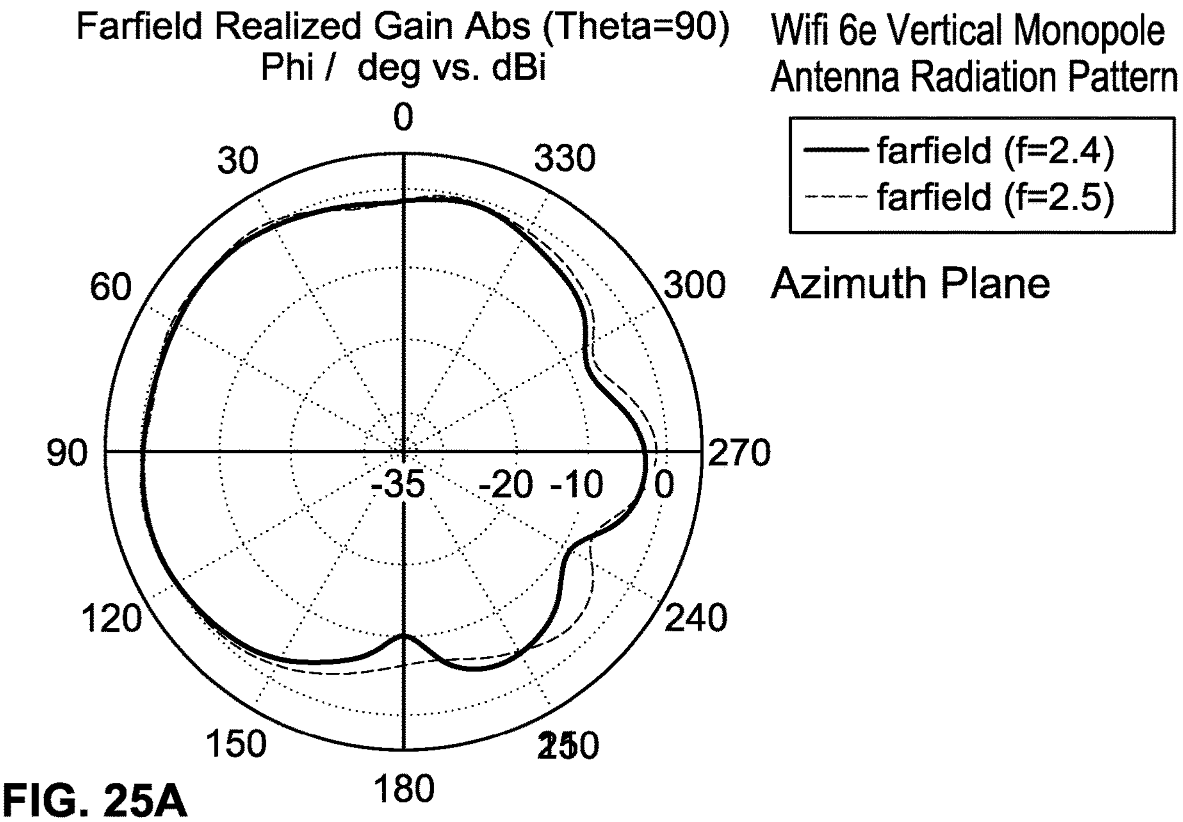
FIGS. 25A-D shows standalone Wi-Fi antenna radiation patterns of a vertical monopole Wi-Fi antenna in accordance with an exemplary embodiment.
Figure 25B:
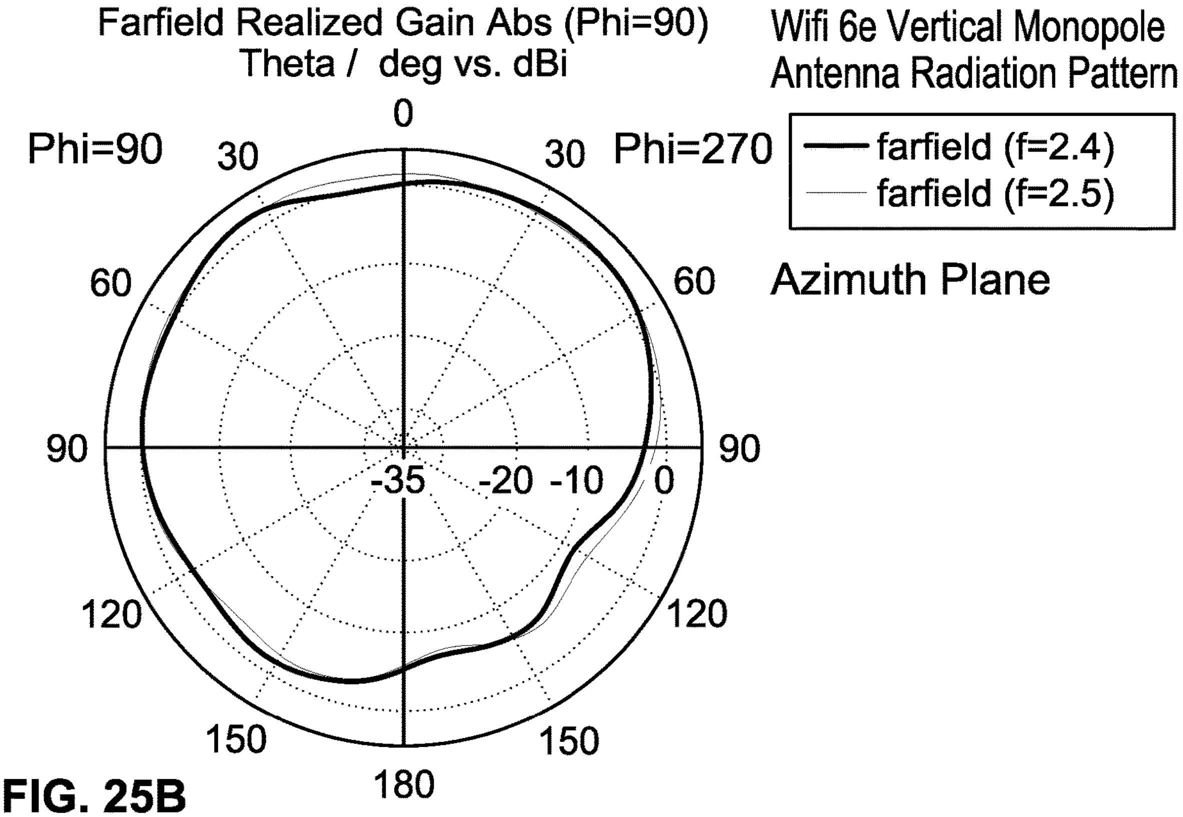
Figure 25C:
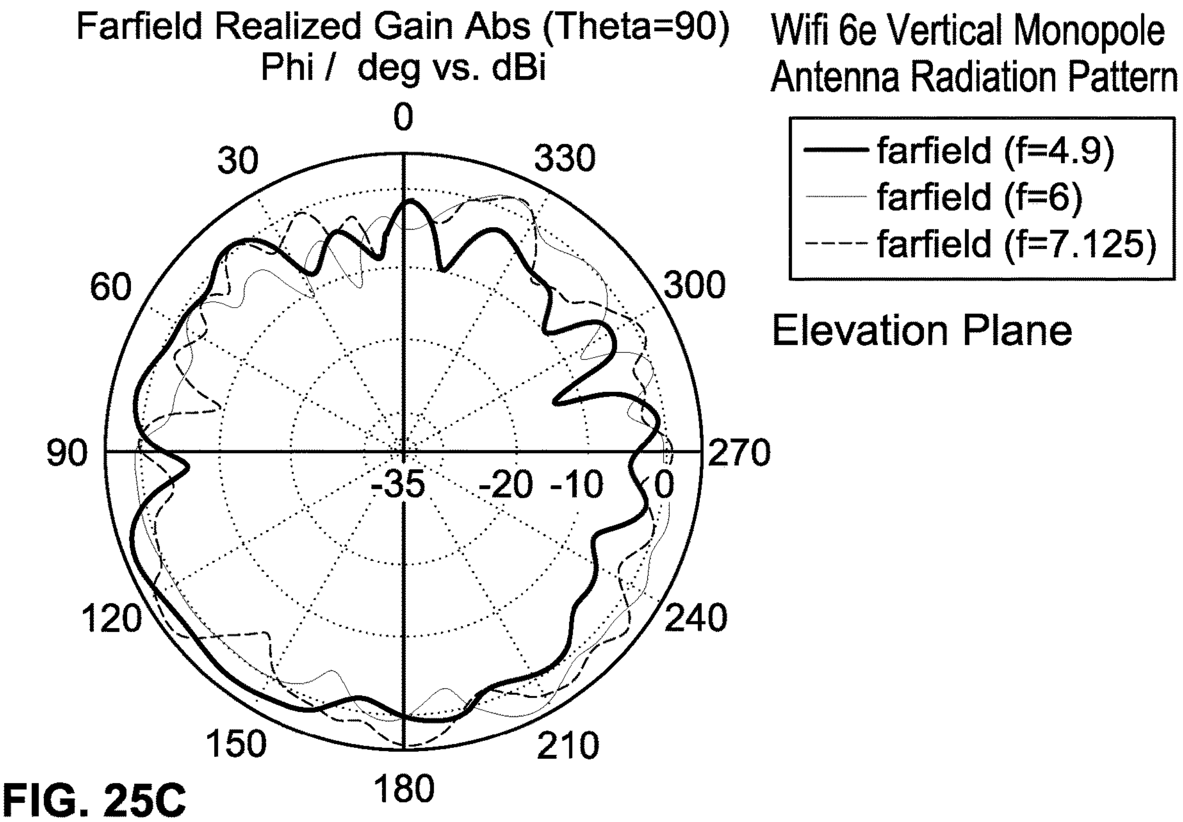
Figure 25D:
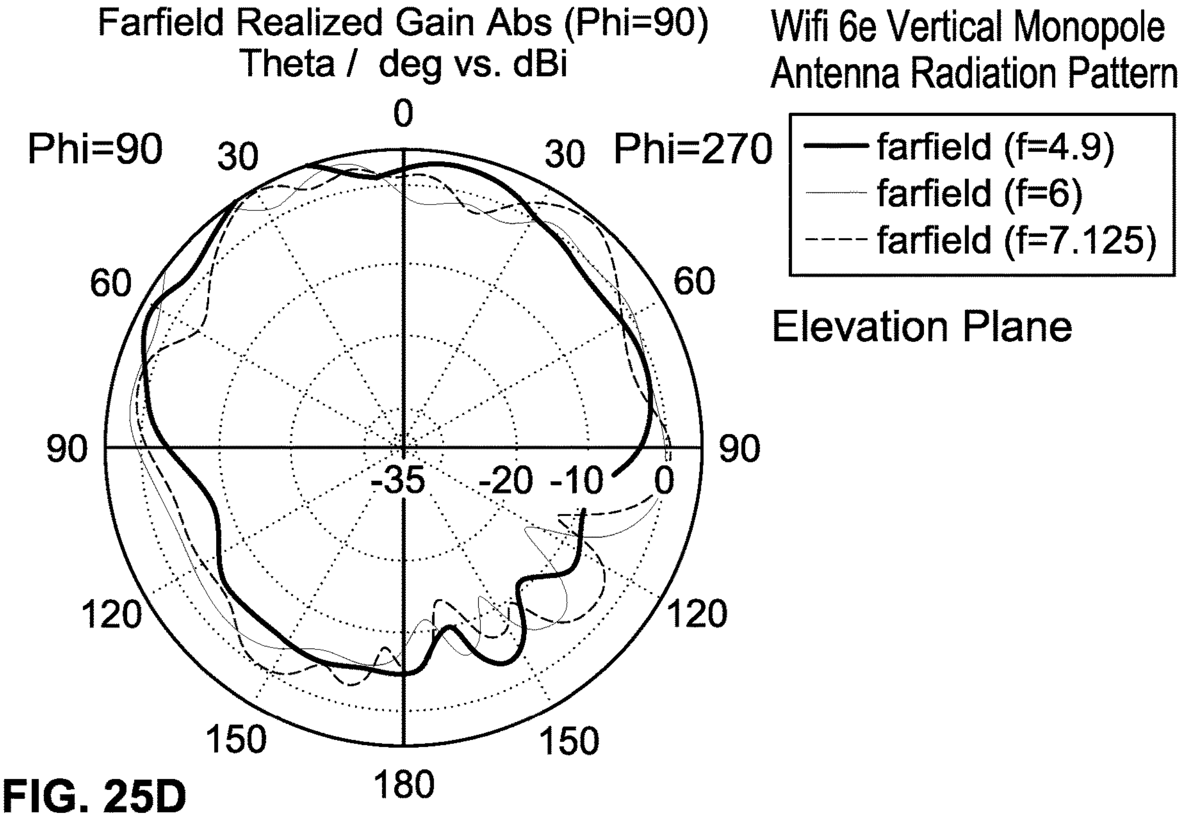

FIG. 20 is a top view of a portion of the antenna assembly 100 illustrating components of the antenna assembly 100 in a first antenna arrangement. In the illustrated embodiment, the antenna assembly 100 includes twenty-one ports (for example, twenty-one radiating elements and cable feeds) in the footprint of the antenna base 112. The antenna elements are operable at various frequencies. Other arrangements are possible in alternative embodiments. In the illustrated embodiment, the antenna assembly 100 includes four of the cellular antennas 200, each including two of the integrated Wi-Fi open slot antenna 220. The antenna assembly 100 includes four of the standalone Wi-Fi antennas 230, each including two radiating elements. The antenna assembly 100 includes the GNSS/GPS satellite antenna 204.

FIGS. 21 through 25 provide analysis results measured for an exemplary antenna assembly having the antenna arrangement as shown in FIG. 15. FIG. 21A-D shows cellular antenna azimuth radiation patterns. FIGS. 22A-D shows cellular antenna elevation radiation patterns. FIGS. 23A-D shows integrated open slot Wi-Fi antenna radiation patterns. FIGS. 24A-D shows standalone Wi-Fi antenna radiation patterns of a cross dipole antenna (FIG. 12). FIGS. 25A-D shows standalone Wi-Fi antenna radiation patterns of a vertical monopole Wi-Fi antenna (FIG. 14). Losses in the performance are kept at a very low level while providing broadband functional bands, such as to satisfy cellular, Wi-Fi, and GNSS/GPS Satellite coverage for a vehicle. The analysis results shown in FIGS. 21-25 are provided for purposes of illustration and not for purposes of limitation. Alternative embodiments of the antenna assembly may be configured differently and have different operational or performance parameters than what is shown in FIGS. 21-25.

It is to be understood that the above description is intended to be illustrative, and not restrictive. For example, the above-described embodiments (and/or aspects thereof)

may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The invention claimed is:

1. A multiband vehicle rooftop antenna assembly for installation to a rooftop of a vehicle, the multiband vehicle rooftop antenna assembly comprising:

an antenna base configured to be mounted to the rooftop of the vehicle, the antenna base including a ground plane, the antenna base having an outer perimeter including a front, a rear opposite the front, a first side, and a second side opposite the first side;

cellular antennas configured to be operable over one or more cellular frequencies, the cellular antennas being mounted to the antenna base at the outer perimeter along the front, the rear, the first side, and the second side, wherein each cellular antenna includes a monopole including a feed portion at a bottom of the monopole and an upper portion at a top of the monopole, the feed portion at a radially outer region of the cellular antenna, the upper portion being bent in a non-planar configuration relative to the feed portion in a radially inward direction toward a central portion of the multiband vehicle rooftop antenna assembly;

Wi-Fi antennas configured to be operable over one or more Wi-Fi frequencies, the Wi-Fi antennas being mounted to the antenna base adjacent the cellular antennas; and a satellite antenna configured to be operable over one or more satellite frequencies, the satellite antenna configured to be operable for receiving Global Navigation Satellite System (GNSS) signals, the satellite antenna located at a central location between the front and the rear and between the first side and the second side.

2. The multiband vehicle rooftop antenna assembly of claim 1, wherein the Wi-Fi antennas are oriented transverse to the cellular antennas.

3. The multiband vehicle rooftop antenna assembly of claim 1, wherein the Wi-FI antennas are mounted to the antenna base at the outer perimeter between the cellular antennas, wherein the cellular antennas face north, south, east and west and wherein the Wi-Fi antennas face north-west, north-east, south-east, and south-west.

4. The multiband vehicle rooftop antenna assembly of claim 1, wherein each Wi-Fi antenna is a dipole antenna configured to be coupled to a first feed and a second feed.

5. The multiband vehicle rooftop antenna assembly of claim 1, wherein the cellular antennas are mounted to the antenna base a first distance from a central point of the antenna base and wherein the Wi-Fi antennas are mounted to the antenna base a second distance from the central point of the antenna base, the second distance being approximately equal to the first distance.

6. The multiband vehicle rooftop antenna assembly of claim 1, wherein the satellite antenna is elevated from the antenna base at a top of the multiband vehicle rooftop antenna assembly.

7. The multiband vehicle rooftop antenna assembly of claim 1, wherein the antenna base is circular.

8. The multiband vehicle rooftop antenna assembly of claim 1, wherein the cellular antennas include four cellular antennas and the Wi-Fi antennas include four Wi-Fi antennas, the cellular antennas and the Wi-Fi antennas being arranged in an octagonal arrangement.

9. The multiband vehicle rooftop antenna assembly of claim 1, wherein the feed portion is coupled to the antenna base proximate to the outer perimeter of the antenna base.

10. The multiband vehicle rooftop antenna assembly of claim 1, wherein the monopole includes a shorting leg extending from the upper portion to the ground plane.

11. The multiband vehicle rooftop antenna assembly of claim 1, wherein the monopole includes an integrated Wi-Fi antenna integrated with the cellular antenna, the integrated Wi-Fi antenna configured to be operable over one or more Wi-Fi frequencies, the integrated Wi-Fi antenna being integrated into the upper portion of the monopole.

12. The multiband vehicle rooftop antenna assembly of claim 11, further comprising an integrated Wi-Fi feed including a cable terminated to the integrated Wi-Fi antenna at an elevated position remote from the antenna base.

13. The multiband vehicle rooftop antenna assembly of claim 12, wherein the cable of the integrated Wi-Fi feed is routed along a shorting leg extending between the upper portion and the ground plane.

14. The multiband vehicle rooftop antenna assembly of claim 11, wherein the monopole includes a second integrated Wi-Fi antenna integrated with the cellular antenna, the second integrated Wi-Fi antenna configured to be operable over one or more Wi-Fi frequencies, the second integrated Wi-Fi antenna being integrated into the upper portion of the monopole, the upper portion including a slot between the integrated Wi-Fi antenna and the second integrated Wi-Fi antenna.

15. The multiband vehicle rooftop antenna assembly of claim 1, wherein the upper portion includes a slot forming an integrated Wi-Fi antenna at the upper portion, the slot in the upper portion extends inward from an edge of the upper portion.

16. The multiband vehicle rooftop antenna assembly of claim 1, wherein the monopole antenna includes a circuit board at the feed portion and a radiator extending from the circuit board defining the upper portion, the circuit board being oriented vertically and extending from the antenna base, the circuit board supporting the radiator relative to the antenna base, the circuit board including a circuit defining a vertical ground plane, a feed cable being terminated to the vertical ground plane and connected to the feed portion.

17. The multiband vehicle rooftop antenna assembly of claim 16, wherein the radiator is stamped and formed from a metal plate including a connecting segment connected to the circuit board and an extension segment extending from the connecting segment and bent out of plane from the connecting segment to define the upper portion.

18. The multiband vehicle rooftop antenna assembly of claim 1, wherein the feed portion is stepped from a central feed point at a bottom of the monopole having multiple steps with slanted edges.

19. The multiband vehicle rooftop antenna assembly of claim 1, further comprising a radome coupled to the antenna base such that an interior enclosure is collectively defined by the radome and the antenna base, the radome being dome shaped and having a generally circular bottom connected to the antenna base, wherein the cellular antennas, the satellite antenna, and the Wi-Fi antennas are located in the internal enclosure.

20. The multiband vehicle rooftop antenna assembly of claim 1, wherein each Wi-Fi antenna includes a Wi-Fi radiating element having a feed portion elevated from the ground plane, a Wi-Fi feed cable being terminated to the feed portion.

21. The multiband vehicle rooftop antenna assembly of claim 1, wherein each Wi-Fi antenna includes a first Wi-Fi radiating element having a first feed portion elevated from the ground plane and a second Wi-Fi radiating element having a second feed portion elevated from the ground plane, a first Wi-Fi feed cable being terminated to the first feed portion, a second Wi-Fi feed cable being terminated to the second feed portion.

22. The multiband vehicle rooftop antenna assembly of claim 1, wherein each Wi-Fi antenna includes a circuit board having at least one circuit element forming a feed portion and at least one circuit element forming a radiator portion operably coupled to the feed portion, the circuit board being oriented vertically and extending from the antenna base, a feed cable being terminated to the feed portion.

23. A multiband vehicle rooftop antenna assembly for installation to a rooftop of a vehicle, the multiband vehicle rooftop antenna assembly comprising:

an antenna base configured to be mounted to the rooftop of the vehicle, the antenna base including a ground plane, the antenna base having an outer perimeter including a front, a rear opposite the front, a first side, and a second side opposite the first side;

cellular antennas configured to be operable over one or more cellular frequencies, the cellular antennas being mounted to the antenna base at the outer perimeter along the front, the rear, the first side, and the second side, each cellular antenna including a monopole including a feed portion at a bottom of the monopole and an upper portion at a top of the monopole, the upper portion being bent in a non-planar configuration;

integrated Wi-Fi antennas integrated with the cellular antennas, the integrated Wi-Fi antenna configured to be operable over one or more Wi-Fi frequencies, each integrated Wi-Fi antenna being integrated into the upper portion of the monopole of the corresponding cellular antenna; and a satellite antenna configured to be operable over one or more satellite frequencies, the satellite antenna configured to be operable for receiving Global Navigation Satellite System (GNSS) signals, the satellite antenna located at a central location between the front and the rear and between the first side and the second side.

24. A multiband vehicle rooftop antenna assembly for installation to a rooftop of a vehicle, the multiband vehicle rooftop antenna assembly comprising:

an antenna base configured to be mounted to the rooftop of the vehicle, the antenna base including a ground plane, the antenna base having an outer perimeter including a front, a rear opposite the front, a first side, and a second side opposite the first side;

cellular antennas configured to be operable over one or more cellular frequencies, the cellular antennas being mounted to the antenna base at the outer perimeter along the front, the rear, the first side, and the second side, each cellular antenna including a monopole including a feed portion at a bottom of the monopole connected to a cellular feed extending through the antenna base, the feed portion at a radially outer region of the cellular antenna, the monopole including an upper portion at a top of the monopole, the upper portion being bent in a non-planar configuration relative to the feed portion in a radially inward direction toward a central portion of the multiband vehicle rooftop antenna assembly, the monopole including a shorting leg extending between the upper portion and the ground plane, the shorting leg located radially inward of the feed portion;

Wi-Fi antennas configured to be operable over one or more Wi-Fi frequencies, each Wi-Fi antenna being connected to a Wi-Fi feed extending through the base; and a satellite antenna configured to be operable over one or more satellite frequencies, the satellite antenna configured to be operable for receiving Global Navigation Satellite System (GNSS) signals, the satellite antenna located at a central location between the front and the rear and between the first side and the second side.

* * * * *